(12) United States Patent
Williams et al.

(10) Patent No.: US 12,107,984 B2
(45) Date of Patent: Oct. 1, 2024

(54) MULTIMEDIA MESSAGING APPARATUSES AND METHODS FOR SENDING MULTIMEDIA MESSAGES

(71) Applicant: MUSIC MAKES US FEELS, LLC, Encino, CA (US)

(72) Inventors: Barry Chandler Williams, Malibu, CA (US); Robert Suarez, Truckee, CA (US)

(73) Assignee: MUSIC MAKES US FEELS, LLC, Encino (CA)

( * ) Notice: Subject to any disclaimer, the term of this patent is extended or adjusted under 35 U.S.C. 154(b) by 0 days.

(21) Appl. No.: 18/478,436

(22) Filed: Sep. 29, 2023

(65) Prior Publication Data

US 2024/0171670 A1    May 23, 2024

Related U.S. Application Data

(60) Provisional application No. 63/427,467, filed on Nov. 23, 2022, provisional application No. 63/427,466, (Continued)

(51) Int. Cl.
*G06F 3/01* (2006.01)
*G06F 3/0482* (2013.01)
(Continued)

(52) U.S. Cl.
CPC ........ *H04M 1/72436* (2021.01); *G06F 3/017* (2013.01); *G06F 3/0482* (2013.01);
(Continued)

(58) Field of Classification Search
CPC ...... G06F 3/017; G06F 16/901; G06F 18/214; G06F 3/0482; H04M 2250/22;
(Continued)

(56) References Cited

U.S. PATENT DOCUMENTS 8,443,290 B2    5/2013  Bill
9,363,360 B1    6/2016  Mirho
(Continued)

OTHER PUBLICATIONS

Baek et al., "Human Computer Interaction for the Accelerometer-Based Mobile Game", Embedded and Ubiquitous Computing Lecture Notes in Computer Science; LNCS; Springer, Berlin, DE, pp. 509-518, Jan. 1, 2006.
(Continued)

*Primary Examiner* — Marcos L Torres
(74) *Attorney, Agent, or Firm* — Carter, DeLuca & Farrell LLP; George Likourezos; Thomas Mattioli

(57) ABSTRACT

A messaging apparatus for sending a multimedia message includes a processor and a memory coupled to the processor and including instructions stored thereon. The instructions, when executed by the processor, cause the messaging apparatus to send display a list of multimedia contents on a screen based on a search term, receive a user's selection of one of displayed multimedia contents, obtain text content corresponding to the selected multimedia content, receive a user's selection of a graphical representation of the user's emotion, combine, in order, the selected multimedia content, as a first layer, the selected graphical representation of the user's emotion, as a second layer, and the text content, as a third layer, to generate a flattened multimedia message, and send the flattened multimedia message via a messaging application.

28 Claims, 19 Drawing Sheets

Related U.S. Application Data filed on Nov. 23, 2022, provisional application No. 63/427,468, filed on Nov. 23, 2022.

(51) Int. Cl.
  *H04L 51/04* (2022.01)
  *H04L 51/10* (2022.01)
  *H04L 51/216* (2022.01)
  *H04L 51/52* (2022.01)
  *H04M 1/72436* (2021.01)
  *G06F 16/901* (2019.01)
  *G06F 18/214* (2023.01)

(52) U.S. Cl.
  CPC .............. *H04L 51/04* (2013.01); *H04L 51/10* (2013.01); *H04L 51/216* (2022.05); *H04L 51/52* (2022.05); *G06F 16/901* (2019.01); *G06F 18/214* (2023.01); *H04M 2250/22* (2013.01)

(58) Field of Classification Search
  CPC .... H04M 1/72436; H04L 51/04; H04L 51/10; H04L 51/216; H04L 51/52
  See application file for complete search history.

(56) References Cited

U.S. PATENT DOCUMENTS

| | | |
|---|---|---|
| 9,686,346 B2 | 6/2017 | Gärdenfors et al. |
| 9,910,499 B2 | 3/2018 | Adzhigirey et al. |
| 10,599,383 B2 | 3/2020 | Na et al. |
| 10,855,787 B2 | 12/2020 | Olinger et al. |
| 11,212,383 B2 | 12/2021 | Voss et al. |
| 2009/0027338 A1* | 1/2009 | Weinberg .............. G10H 1/0083 345/157 |
| 2011/0083111 A1* | 4/2011 | Forutanpour ........... H04W 4/21 715/863 |
| 2012/0120000 A1* | 5/2012 | Lucic .................. G06F 3/04886 345/173 |
| 2018/0004295 A1 | 1/2018 | Birnbaum et al. |
| 2018/0310171 A1 | 10/2018 | Whitaker et al. |
| 2021/0373672 A1 | 12/2021 | Schwarz et al. |
| 2022/0191157 A1* | 6/2022 | Lee ....................... H04L 51/063 |

OTHER PUBLICATIONS

International Search Report and Written Opinion for PCT/US2023/080283 dated Mar. 19, 2024, 17 pages.

* cited by examiner

MULTIMEDIA MESSAGING APPARATUSES AND METHODS FOR SENDING MULTIMEDIA MESSAGES

CROSS-REFERENCE TO RELATED APPLICATIONS

This application claims the benefit of and priority to U.S. Provisional Patent Application No. 63/427,466 filed on Nov. 23, 2022, U.S. Provisional Patent Application No. 63/427,467 filed on Nov. 23, 2022 and U.S. Provisional Patent Application No. 63/427,468 filed on Nov. 23, 2022, all the content of the three provisional applications is incorporated herein by reference as if fully set forth.

FIELD

The present disclosure relates generally to multimedia messaging apparatuses and methods for sending multimedia messages, and, more specifically, for sending multimedia messages with emotions.

BACKGROUND

Messaging applications are a common medium for communicating between users. Various systems and applications can make use of multimedia messaging for transmitting rich media to users. Multimedia messages can include video and/or audio data with text messages. Generally, users could infer sentiment of the sender from the multimedia messages and text messages. Sometimes, however, multimedia messages may not truly relay sentiment of the sender to other users because sentiment or emotion of the sender is subjective and self-contained phenomenal experiences. Even if receiving users understand general sentiment of the Multimedia messages, it might be difficult for the receiving users to understand a level of sentiment of the sender.

SUMMARY

The present disclosure relates to multimedia messaging apparatuses and methods for sending multimedia messages with a graphical representation of a sender's sentiment or emotion. In particular, the present disclosure relates to multimedia messaging apparatuses and methods for combining multimedia content, corresponding text content, and the graphical representation of the sender's sentiment and for displaying a plurality of graphical representations in order based on the multimedia content and corresponding text content. Furthermore, the present disclosure relates to multimedia messaging apparatuses and methods for sending multimedia messages based on a gesture of the sender.

In accordance with aspects of the present disclosure, a messaging apparatus for sending a multimedia message via a gesture includes a processor and a memory coupled to the processor and including instructions stored thereon. The instructions, when executed by the processor, cause the messaging apparatus to receive sensor data from one or more sensors, analyze the received sensor data to identify a gesture, perform a search in a list of predetermined gestures based on the identified gesture, select a multimedia message based on a searched predetermined gesture, and send the selected multimedia message via a messaging application.

In aspects, the list of predetermined gestures has been previously saved.

In aspects, the messaging apparatus further includes a touch screen, which functions as the one or more sensors. The touch screen generates the sensor data based on a motion of a user on the touch screen.

In aspects, the one or more sensors include a motion sensor. The sensor is worn by a user. The motion sensor includes at least one of a gyroscope, accelerometer, magnetometer, radar, or lidar.

In aspects, the sensor data is collected within a predetermined time.

In aspects, a relationship database between the list of predetermined gestures and multimedia messages is stored in the memory. The selected multimedia message is related to the searched predetermined gesture based on the relationship database.

In accordance with aspects of the present disclosure, a messaging method for sending a multimedia message via a gesture includes receiving sensor data from one or more sensors, analyzing the received sensor data to identify a gesture, performing a search in a list of predetermined gestures based on the identified gesture, selecting a multimedia message based on a searched predetermined gesture, and sending the selected multimedia message via a messaging application.

In aspects, the list of predetermined gestures has been previously saved.

In aspects, the messaging apparatus further includes a touch screen, which functions as the one or more sensors. The touch screen generates the sensor data based on a motion of a user on the touch screen.

In aspects, the one or more sensors include a motion sensor. The sensor is worn by a user. The motion sensor includes at least one of a gyroscope, accelerometer, magnetometer, radar, or lidar.

In aspects, the sensor data is collected within a predetermined time.

In aspects, a relationship database between the list of predetermined gestures and multimedia messages is stored in the memory. The selected multimedia message is related to the searched predetermined gesture based on the relationship database.

In accordance with aspects of the present disclosure, a nontransitory computer-readable storage medium includes instructions stored thereon. The instructions, when executed by a computer, cause the computer to perform a messaging method for sending a multimedia message with an emotional representation. The method includes receiving sensor data from one or more sensors, analyzing the received sensor data to identify a gesture, performing a search in a list of predetermined gestures based on the identified gesture, selecting a multimedia message based on a searched predetermined gesture, and sending the selected multimedia message via a messaging application.

In aspects, the messaging apparatus trains a first predetermined gesture of the list of predetermined gestures.

In aspects, the training the first predetermined gesture of the list of predetermined gestures includes tapping an apparatus to a chest of a user a first time.

In aspects, the training the first predetermined gesture of the list of predetermined gestures includes tapping the apparatus to the chest of the user one or more subsequent times to complete training of the first predetermined gesture.

In aspects, tapping the apparatus to the chest of the user upon completion of training for the first predefined gesture includes selecting a multimedia message associated with the first predetermined gesture, and sending the selected multimedia message via the messaging application.

BRIEF DESCRIPTION OF THE DRAWINGS

A detailed description of aspects of the disclosure will be made with reference to the accompanying drawings, wherein like numerals designate corresponding parts in the figures.

DETAILED DESCRIPTION

Provided in this disclosure are multimedia messaging servers, computing devices, and methods for flattening layers of contents to generate a flattened content as a multimedia message, displaying graphical representations of emotions in order, and sending multimedia messages based on gestures. The multimedia messages, within which sentiment of a sender is incorporated, are transmitted so that receivers of the multimedia messages can easily recognize the sentiment of the sender. Sentiments or emotions of the sender are represented in corresponding graphical representations.

Further, the sentiments or emotions are categorized into different categories and levels. After analyzing an audiovisual content and the corresponding text content, one category of emotions is displayed up front and the other categories are displayed next based on a distance from the one category.

Furthermore, sensor data are collected and analyzed to identify a gesture. A flattened multimedia message, which is correlated with the identified gesture, can be automatically sent to other users.

Figure 1:
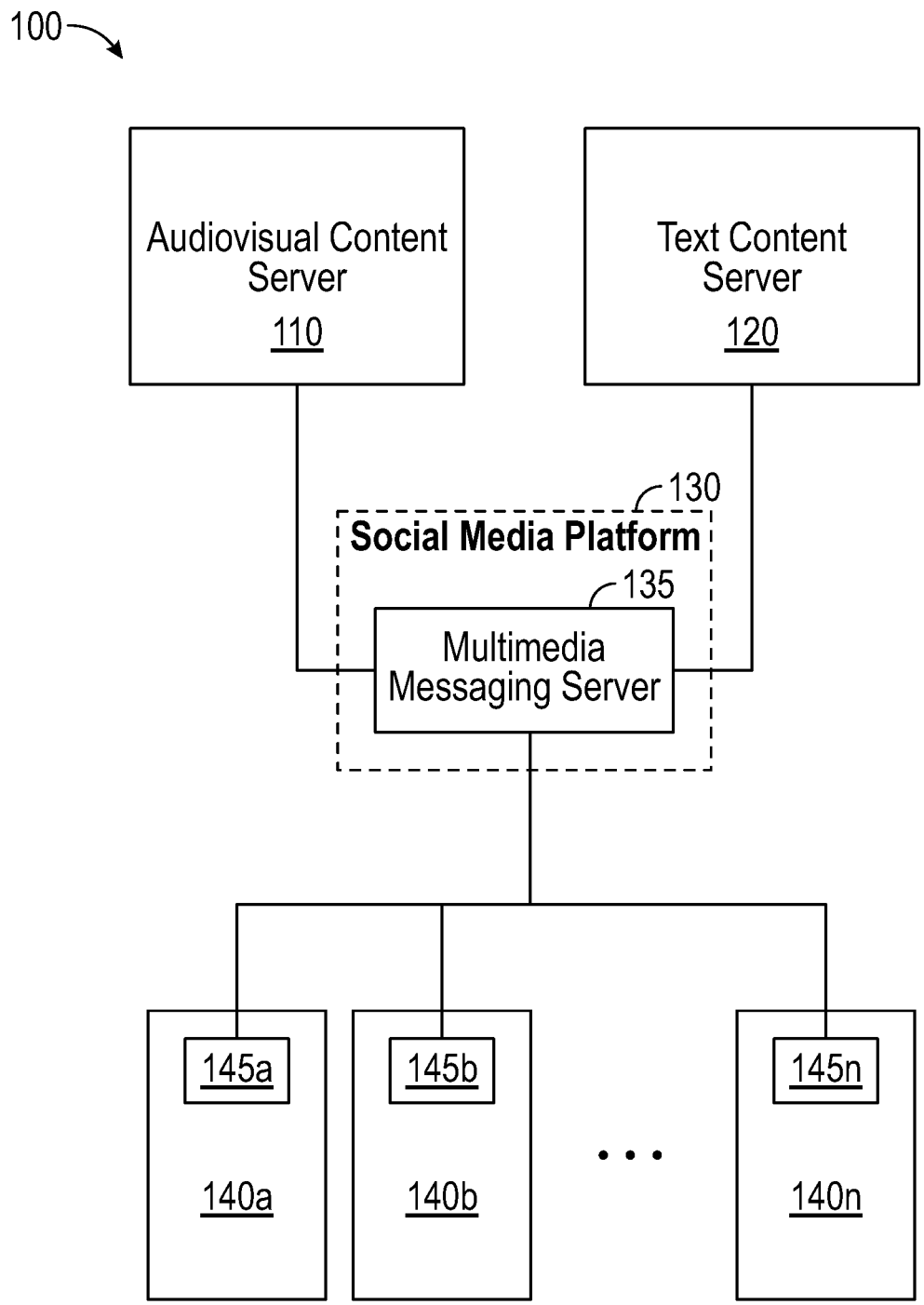
FIG. 1 illustrates a block diagram of a multimedia messaging system for sending multimedia messages in accordance with one or more aspects.

FIG. 1 shows a block diagram for a multimedia messaging system 100 for sending and receiving multimedia messages among users 140a-140n in accordance with aspects of the present disclosure. The multimedia messaging system 100 includes an audiovisual content server 110, a text content server 120, and a multimedia messaging server 135. In an aspect, the multimedia messaging system 100 may optionally include a social media platform 130. The users 140a-140n are used collectively or and the user 140 is used individually in this disclosure.

The users 140a-140n use the social media platform 130 to communicate with each other by using their own computing devices 145a-145n, such as mobile devices or computers. As the users 140a-140n and the user 140 are used, the computing devices 145a-145n are used collectively and the computing device 145 is used individually in this disclosure. The social media platform 130 can be YouTube®, Facebook®, Twitter®, Tik Tok®, Pinterest®, Snapchat®, LinkedIn®, and the likes. The social media platform can also be a virtual reality (VR), mixed reality (MR), augmented reality (AR), and metaverse platform. In response to the shared text and multimedia message, the user 140 may send a graphical representation (e.g., emojis, graphic images, gifs, moving gifs, etc.) to show their emotion/sentiment/feeling. However, no social media platforms 130 send a multimedia message, into which the sender's sentiment is incorporated. The multimedia messaging system 100 is capable of incorporating the sender's sentiment into a multimedia message according to aspects of the present disclosure.

In an aspect, the multimedia messaging server 135 may be incorporated within the social media platform 130 to enable the user 140 to send a multimedia message together with the sender's sentiment. In another aspect, the multimedia messaging server 135 may be a standalone server for sharing multimedia messages with the sender's sentiment between the users 140a-140n.

The audiovisual content server 110 may be a music server, which includes audios and music videos of songs, an audio recording server, which stores recordings of phone conversations and meetings, a moving image server, which stores movie files or any moving image files, or any audiovisual server including audiovisual contents. Each audiovisual content may be a digital file and have information about a time duration thereof.

The audiovisual content server 110 has categorized audiovisual contents into different categories of genres, and thus, when the user 140 searches for a specific genre, the audiovisual content server 110 may send to the user 140 a list of the searched genre of audiovisual contents. Likewise, the audiovisual content server 110 may also categorize the audiovisual contents into categories of emotions/sentiments, and the audiovisual content server 110 may be able to send a list of audiovisual contents, which has specific sentiment upon the user 140's request through the multimedia messaging server 135.

Based on the audiovisual contents saved in the audiovisual content server 110, the text content server 120 may have corresponding text content. In other words, when the audiovisual content server 110 has a song, the text content server 120 has the lyric of the song, and when the audiovisual content server 110 has a recording of a phone conversation, the text content server 120 has transcribed texts of the phone conversation. The text content may be saved in the "lrc" format, which is a computer file format that synchronizes song lyrics with an audio file, such as MP3, Vorbis or MIDI, or in the "sct" format, which is a popular subtitle file format for audiovisual content. These examples of format types for text contents are provided for exemplary purposes only and are not meant to be limited. The list of format types may include other formats, which persons having skilled in the art would readily appreciate.

These formats generally include two parts. One is a timestamp, which includes a starting time and an ending time, and the other one includes text information within the starting and ending times. Thus, when a text content during a certain period of time (e.g., 00:01:30~00:03:00) is requested, the corresponding text content can be extracted and retrieved with ease from the textual content based on the timestamps. In an aspect, the multimedia messaging server 135 may be able to extract and retrieve a portion of the textual content or the text content server 120 may provide such a portion upon request.

In an aspect, when the selected audiovisual content is a recording of a meeting and there is no text content for the selected audiovisual content, the multimedia messaging server 135 may perform a transcription operation to transcribe the recording or contact a transcribing server to receive the transcribed text information.

After receiving the audiovisual content from the audiovisual content server 110 and the text content from the text content server 120, the multimedia messaging server 135 may combine the two to generate a flattened multimedia message, which may include a graphical representation of an emotion of the sender. In an aspect, the flattened multimedia message may be inseparable so that it cannot be separated into the multimedia content and the textual content, and may be saved locally in the computing device 145 of the sender. In another aspect, the multimedia messaging server 135 may save the flattened multimedia message in its memory under the account of the sender.

Figure 2:
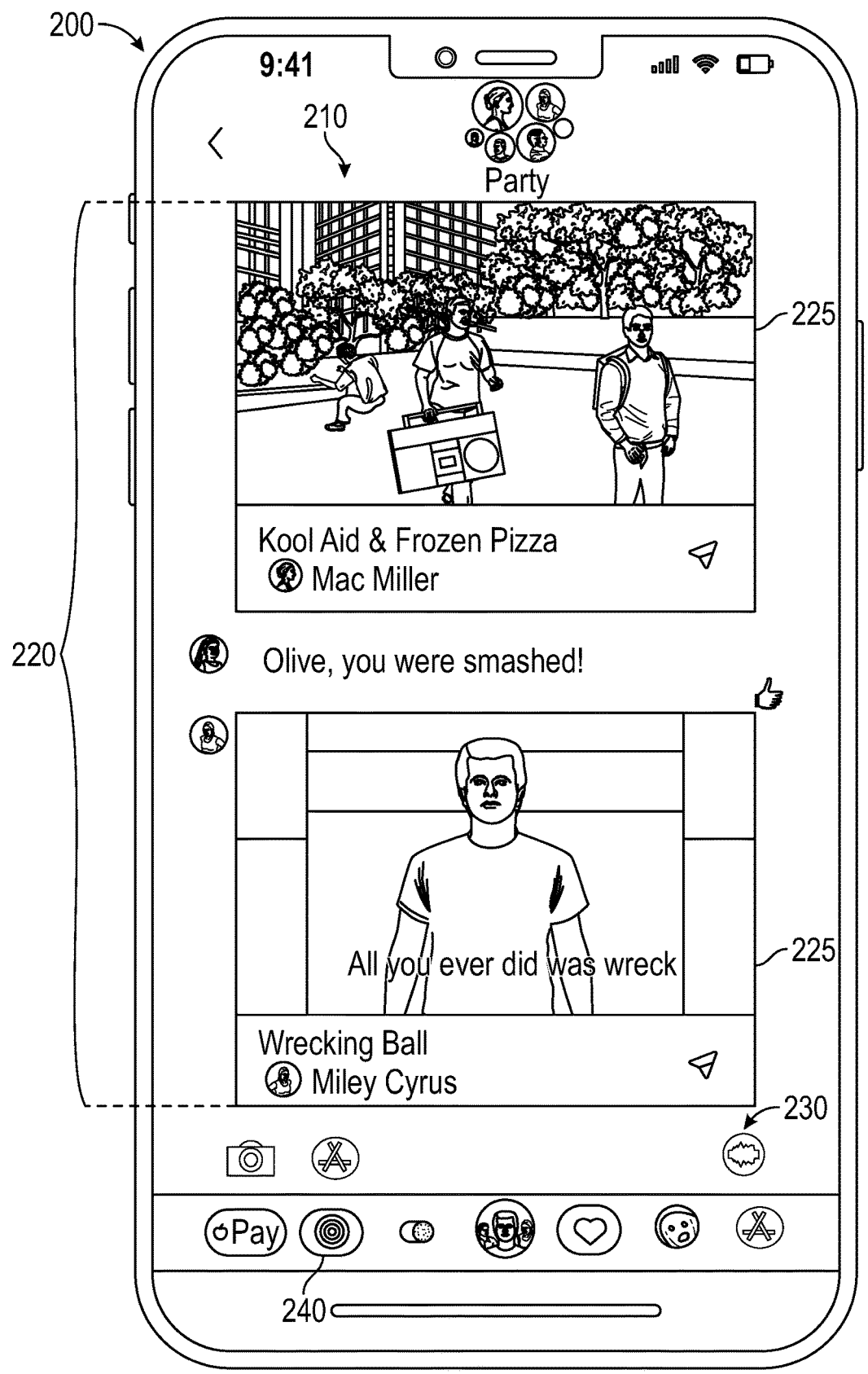
FIG. 2 illustrates a graphical representation of a mobile device screen showing exchange of multimedia messages in accordance with one or more aspects.

FIG. 2 shows a screenshot 200 of a mobile device according to aspects of the present disclosure. The screenshot 200 shows a messaging interface 210 of a social media platform (e.g., the social media platform 130 of FIG. 1) or a multimedia messaging server (e.g., the multimedia messaging server 135 of FIG. 1) as a standalone system. Since the description for the messaging interface 210 of the multimedia messaging server is substantially similar as that of the messaging interface 210 for the social media platform, the social media platform is described below and description of the multimedia messaging server is omitted and can be referred to below.

The messaging interface 210 includes a chain of messages 220, which may include multimedia messages, text messages, and emojis. The chain of messages 220 is scrollable so that users can track the messages 220 by scrolling up and down. As shown, the chain of messages 220 may include a multimedia message 225, which is sent via the social media platform but not by the multimedia messaging server. The multimedia message 225 includes a video portion, and a subtitle portion is superimposed over the video portion. The subtitle portion may show the title of the song, singer's name, and/or lyric. However, the subtitle portion is separable from the video. Further, the multimedia message 225 does not inseparably incorporate a graphical representation of the sender's emotion. Incorporation of the sender's emotion into a multimedia message will be described below with reference to FIGS. 3-5.

The messaging interface 210 includes an input section 230. Users can take a picture, upload a saved image, and enter text messages within the text field. The messaging interface 210 also includes an additional input section 240, through which the users can send various types of messages. One of the icons in the additional input section 240 is an icon for the multimedia messaging server (e.g., the multimedia messaging server 135 of FIG. 1). Through the icon, users can request multimedia content with a specific sentiment, combine layers of contents to generate a flattened multimedia message with an incorporated sentiment, and send the multimedia message to other users.

Figure 3:
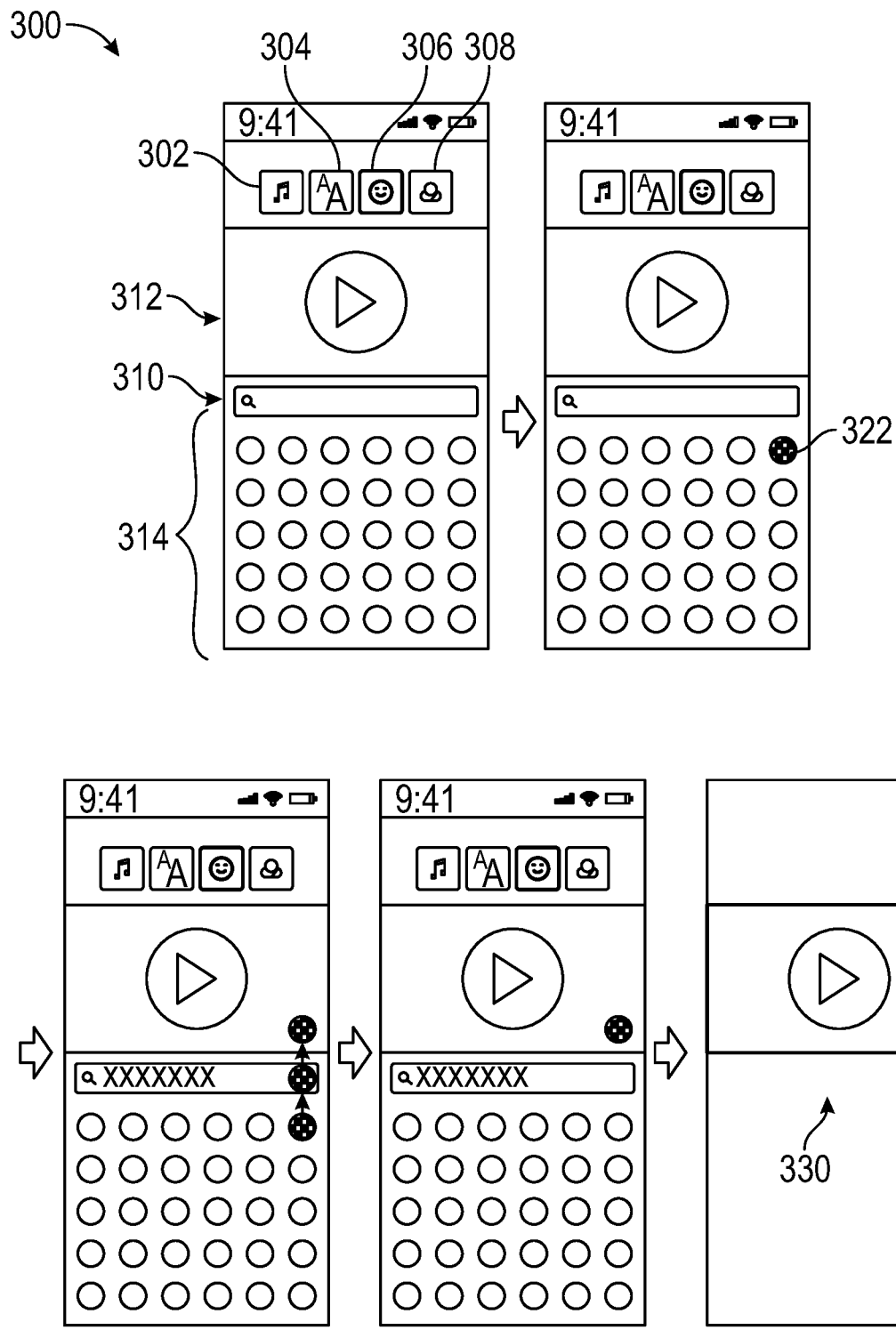
FIG. 3 illustrates graphical flow representations of a mobile device screen for forming a flattened multimedia message in accordance with one or more aspects.

When the icon for the multimedia messaging server is selected or clicked, another window may be popped up or shown within the messaging interface 210. For example, as shown in FIG. 3, a window 300 may be displayed on the screen of the computing device of a user. The window 300 may include four icons in the top region: a multimedia icon 302, a text content icon 304, a sentiment icon 306, and a combination icon 308. When one icon is selected, the selected icon may be inverted or have graphical effects so that the selected icon may be outstanding from the other icons. The window 300 also includes a text input section 310 where the user enters text inputs.

When the user wants to send a sad multimedia message, the user chooses the multimedia icon 302 and enters the user's sentiment in the text input section 310. The multimedia messaging server sends the user's sentiment as a searching term to the audiovisual content server. The user may send any search term such as "party," "Halloween," "Christmas," "graduation," "marriage," "funeral," etc. The search term further includes any terms in the lyric, artist names, emotions, title, and any other terms. In response, the audiovisual content server sends a list of audiovisual contents (e.g., songs, videos, movies, etc.) based on the search term. In a case where the user does not enter a search term in the text input section 310 and presses the enter key, the audiovisual content server may return a list of arbitrary audiovisual contents.

In aspects, the multimedia messaging server may utilize artificial intelligence to train a sentiment model so that the multimedia messaging server sends additional information with the searching term to the audiovisual content server. The sentiment model may be trained to analyze information (e.g., the history of message exchange) so as to further define the current sentiment of the user, and the multimedia messaging server may send the search term with the current user's sentiment to the audiovisual content server so that the user may be able to receive a focused or further refined list of audiovisual contents from the audiovisual content server. The sentiment model may further analyze weather conditions, user's activities on the Internet, or any other activities saved in the user's computing device to refine the user's current sentiment. For example, when the user searches the Internet with "Halloween" or "costumes," the sentiment model may identify the user's sentiment as being anticipated or joyful. When the user searches terms related to "funeral" on the Internet, the sentiment model may identify the user's sentiment as being grieved or sad.

After the multimedia messaging server displays the list on the window 300, the user selects one audiovisual content in the displayed list, and the selected audiovisual content is displayed in a video section 312 within the window 300. In a case where the user wants a portion of the selected audiovisual content, the user then specifies a period starting from a starting time and ending at an ending time within the selected audiovisual content. The multimedia messaging server may store the specified portion in a temporary storage.

In aspects, the multimedia messaging server may provide visual effects (hereinafter lenses) to the selected audiovisual content. For example, the lenses may provide for users to customize audiovisual contents and save customization settings to their collections. Lenses may be designed, preset, and saved in the multimedia messaging server. The lenses may be filters that adjust the visual attributes of the audiovisual content. Key adjustments of the lenses include exposure, contrast, highlights, shadows, saturation, temperature, tint, tone and sharpness. Lenses may not be editable by the users.

The user now selects or clicks the text content icon 304 after selection of the audiovisual content is completed. The multimedia messaging server then automatically sends to the text content server a request for text content corresponding to the selected audiovisual content and automatically receives the corresponding text content. In a case where a portion of the selected audiovisual content is selected by the user, the multimedia messaging server may extract the corresponding text content from the obtained text content based on the starting time and ending time. The multimedia messaging server may store the text content in the temporary storage and indicates to the user completion of retrieval of the text information.

Now referring back to the window 300 of FIG. 3, the user selects the sentiment icon 306. The window 300 shows a sentiment section 314, which displays graphical representations of emotions. When a user selects one graphical representation 322 displayed in the sentiment section 314, the selected graphical representation may be inverted or have graphical effects thereon to be differentiated from the non-selected graphical representations.

When the user is satisfied with the selected graphical representation 322, the user clicks, drags, and drops the selected graphical representation 322 at the video section 312. The user selects or clicks the combination icon 308, and then the multimedia messaging server inseparably combines the selected audiovisual content, the text content, and the graphical representation 322 to generate a flattened multimedia message 330, which is then saved in a permanent storage of the multimedia messaging server and/or locally in a storage of the computing device of the user.

In aspects, the user may be able to determine a location of the text content within the audiovisual content when the audiovisual content and the text content are combined. The audiovisual content may be divided into three regions: top, middle, and bottom regions. Each of the three regions may be further divided into three subregions: left, center, and right. When one of the three regions or the nine subregions is selected, the text information may be incorporated at the selected region or subregion within the flattened multimedia message.

In aspects, the multimedia messaging server may automatically vary the location of the text information within the flattened multimedia message by training artificial intelligence or machine learning algorithms. In particular, the artificial intelligence or machine learning algorithms may be trained to differentiate foregrounds from backgrounds and locate the text content at the backgrounds so that the foregrounds are not obstructed by the text or machine learning. Further, the artificial intelligence or machine learning algorithms may change the color of the text content so that the color of the text content can be substantially different or outstanding from the color of the backgrounds.

Figure 4:
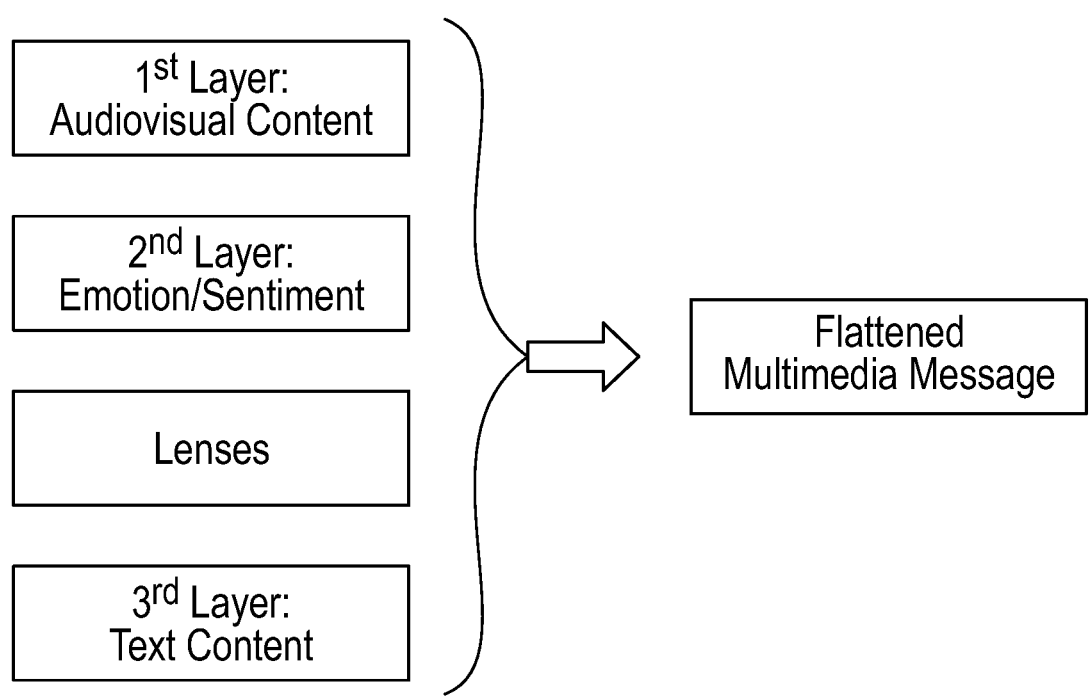
FIG. 4 illustrates a block diagram of layers in a flattened multimedia message in accordance with one or more aspects.

Now referring to FIG. 4, a flattened multimedia message is illustrated with three layers of contents. The first layer is the audiovisual content, the second layer is a graphical representation of the user's sentiment or emotion, and the third layer is the text content corresponding to the audiovisual content. Within the flattened multimedia message, the second layer is overlaid or superimposed over the first layer, and the third layer is overlaid or superimposed over the second layer in order. That means that the second layer may obstruct the first layer and the third layer may obstruct the first and second layers. Since the flattened multimedia message has only one layer, the first, second, and third layers cannot be separated from the flattened multimedia message after being flattened. In other words, the flattened multimedia message has only one layer.

The lenses are not part of the three layers but are rather graphical effects applied to the first layer, the audiovisual content. For example, the lenses may be filters configure to change exposure, contrast, highlights, shadows, saturation, temperature, tint, tone and sharpness of the first layer.

When saving the flattened multimedia message, information about flattened multimedia message, information about the three layers, and information about the starting and ending times just in case when a portion of the selected audiovisual content is saved may be saved in a database in the multimedia messaging server or the computing device of the user. In an aspect, all information may be saved as metadata in a header of a digital file of the flattened multimedia message.

When a user searches for audiovisual contents, the multimedia messaging server or the user's computing device may perform a local search first in the previously saved flattened multimedia messages by comparing the search terms with the database or metadata of the previously saved flattened multimedia messages. In a case where there is no match, the multimedia messaging server sends the search terms to the audiovisual server.

Figure 5:
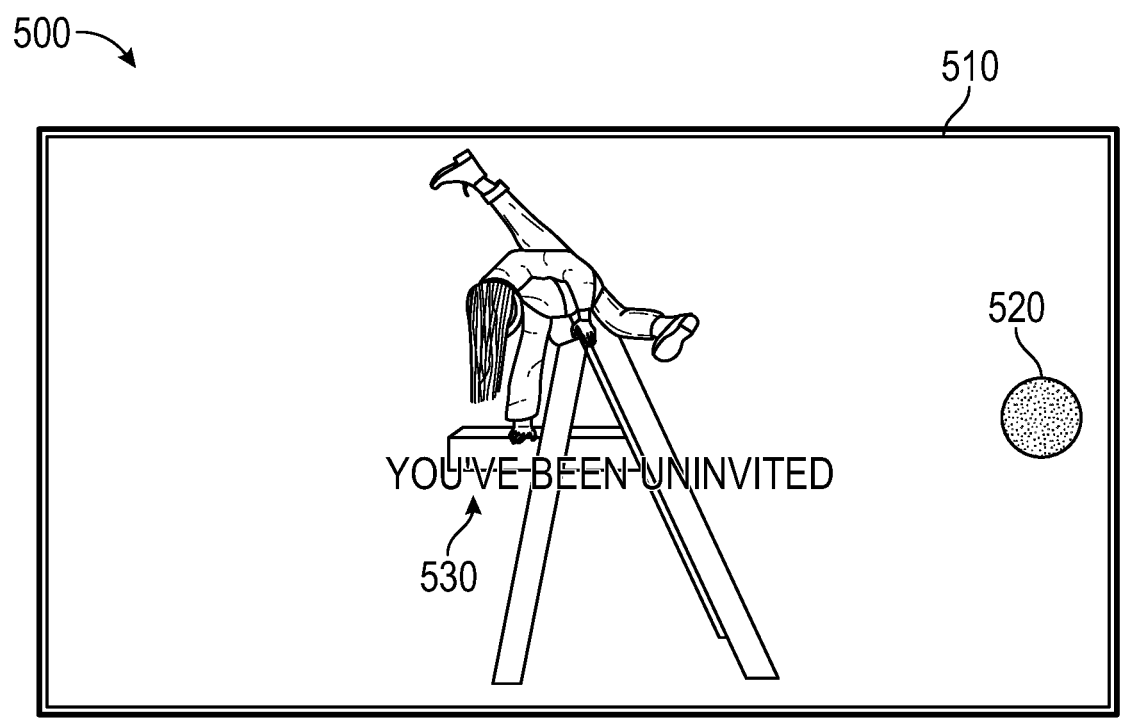
FIG. 5 illustrates a graphical representation of a flattened multimedia message in accordance with one or more aspects.

Now referring to FIG. 5, illustrated is a flattened multimedia message 500 according to aspects of the present disclosure. The flattened multimedia message 500 incorporates a first layer 510 (i.e., a music video of "Copycat" by Billie Eilish), a second layer 520 (i.e., a graphical representation of a user's sentiment or emotion), and a third layer 530 (i.e., the text content or lyric corresponding to the displayed the music video). The graphical representation 520 is displayed as a colored circle and the shape thereof may be changed. Further, the graphical representation 520 may be in a form of emojis, gifs, moving gifs, or any other graphical forms. The second layer stays on the first layer for the whole play time of the first layer. Thus, even if other users see any portion of the flattened multimedia message 500, they can easily figure out the sending user's sentiment based on the second layer 520 without inference and assumption.

Figure 6:
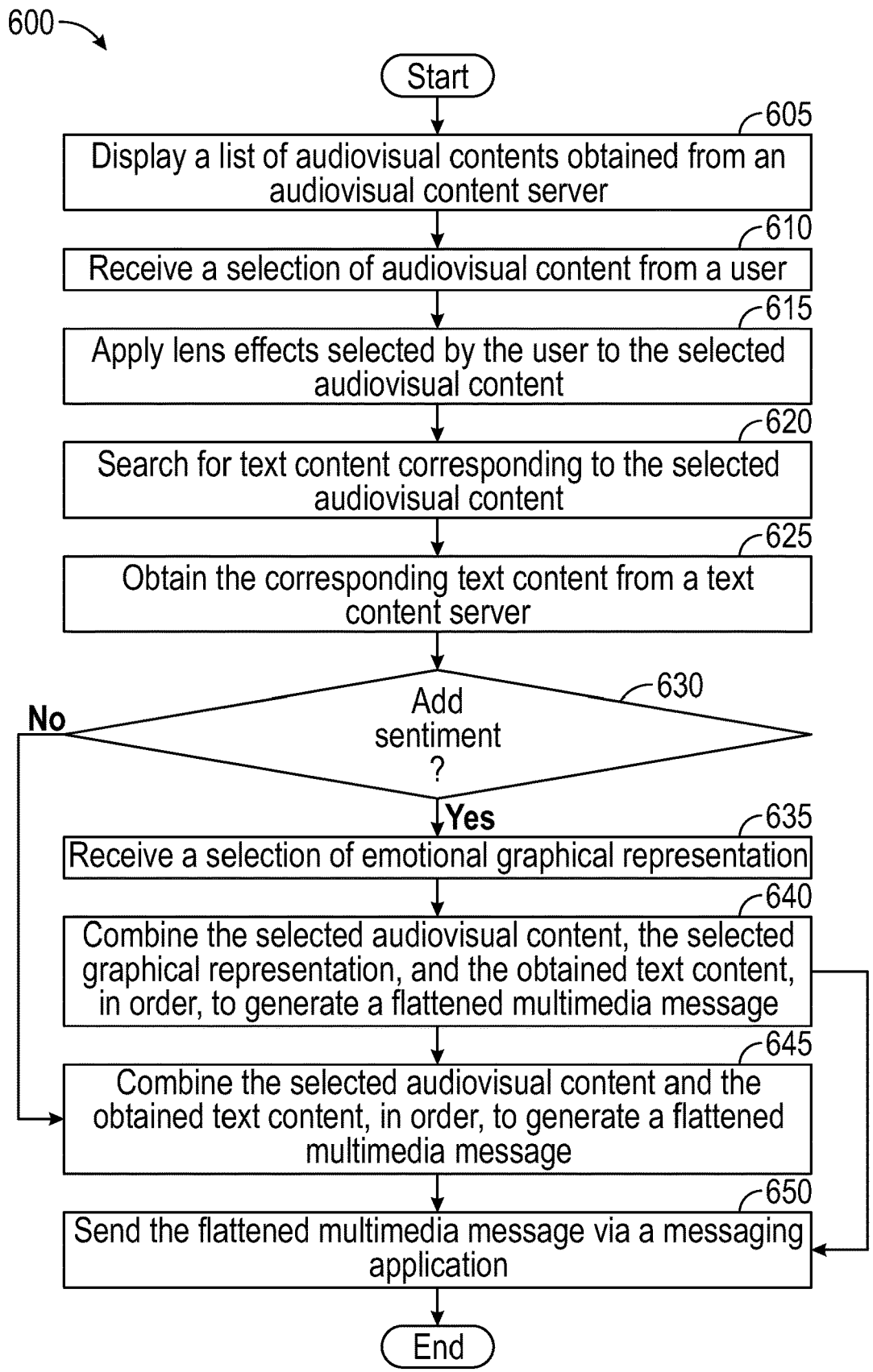
FIG. 6 illustrates a flowchart of a method for forming a flattened multimedia message in accordance with one or more aspects.

FIG. 6 illustrates a method 600 for combining layers of contents to generate a flattened multimedia message according to aspects of the present disclosure. The method 600 is started by displaying, by a multimedia messaging server, a list of audiovisual contents obtained from an audiovisual content server in step 605. A user may send a search term to the multimedia messaging server, and based on the search term, the audiovisual content server provides the list of the audiovisual contents and the multimedia messaging server displays such on a screen of a computing device of the user.

In step 610, the user reviews the displayed audiovisual contents and sends a selection of one audiovisual content, and the multimedia messaging server receives the selection of the audiovisual content from the user. In aspects, the user may specify a starting time and an ending time within the selected audiovisual content to use a portion of the selected audiovisual content. The multimedia messaging server may save the selected audiovisual content or the selected portion at a temporary storage.

In step 615, the user may be able to select one or more lenses, which are filters to make changes to the selected audiovisual content. In response to the selection, the multimedia messaging server applies the selected lenses to the selected audiovisual content. For example, the lenses may be filters to make changes in exposure, contrast, highlights, shadows, saturation, temperature, tint, tone and sharpness to the selected audiovisual content. After the application of the lenses, the selected audiovisual content may become a first layer for a flattened multimedia message.

In step 620, the multimedia messaging server may search for text content corresponding to the selected audiovisual content in a text content server without receiving inputs from the user. In response, the multimedia messaging server receives the corresponding text content from the text content server in step 625. In a case where the user selects a portion of the selected audiovisual content, the multimedia messaging server may extract the corresponding text content from the obtained text content based on the selected portion.

In step 630, it is determined whether or not the user's sentiment is added to flattened multimedia message. When it is determined that the user's sentiment is not added, the selected audiovisual content and the obtained text content are combined to generate a flattened multimedia message in step 645.

When the user's sentiment is determined to be added, the multimedia messaging server receives a graphical representation of the user's sentiment in step 635, and the selected audiovisual content, the selected graphical representation, and the obtained text content are combined, in order, to generate flattened multimedia message in step 640. The flattened multimedia message has only one layer and is inseparable so that the selected audiovisual content, the obtained text content, and the graphical representation cannot be extracted from the flattened multimedia message.

After generation of the flattened multimedia message in steps 640 and 645, the flattened multimedia message is sent to other users by the multimedia messaging server. The method 600 may be repeated whenever users want to send or share flattened multimedia messages to other users.

Figure 7:
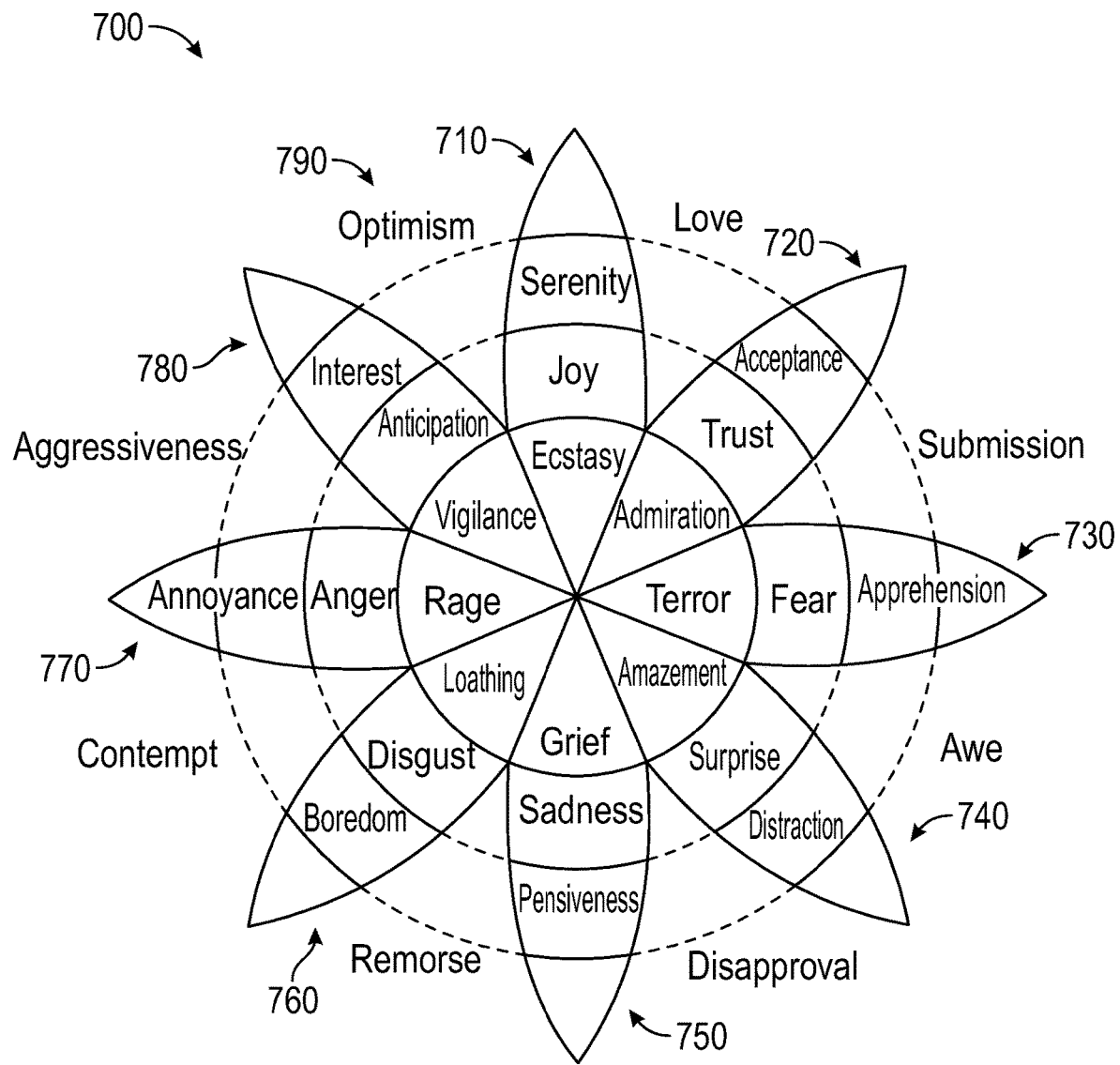
FIG. 7 illustrates a graphical representation of categories of emotions in accordance with one or more aspects.

Now referring to FIG. 7, illustrated is a circular representation 700 of emotions according to aspects of the present disclosure. The circular representation 700 is borrowed from Robert Plutchik's Wheel of Emotions. There are eight categories 710-780 of primary emotions in the circular representation 700. The primary emotions include joy, trust, fear, surprise, sadness, anticipation, anger, and disgust in the clockwise circular order. Each primary emotion has an opposite primary emotion, meaning that one primary emotion is positioned opposite to another primary emotion in the circular representation 700. For example, joy is the opposite of sadness, fear is the opposite of anger, anticipation is the opposite of surprise, and disgust is the opposite of trust. These categories of emotions are provided for exemplary purposes only, and emotions may be categorized differently.

Each category of emotions includes three levels. For example, the category 710 of emotions includes serenity, joy, and ecstasy. The serenity is the lowest level, the joy is the primary emotion, and the ecstasy is the highest level. Likewise, in the category 720, acceptance is the lowest level, trust is the primary emotion, and admiration is the highest level; in the category 730, apprehension is the lowest level, fear is the primary emotion, and terror is the highest level; in the category 740, distraction is the lowest level, surprise is the primary emotion, and amazement is the lowest level; in the category 750, pensiveness is the lowest level, sadness is the primary emotion, and grief is the highest level; in the category 760, boredom is the lowest level, disgust is the primary emotion, and loathing is the highest level; in the category 770, annoyance is the lowest level, anger is the primary emotion, and rage is the highest level; and in the category 780, interest is the lowest level, anticipation is the primary emotion, and vigilance is the highest level.

The circular representation 700 further includes a combination category 790, of which each emotion is combined with two adjacent primary emotions. For example, love is combination of joy and trust; submission is a combined emotion of trust and fear; awe is a combined emotion of fear and surprise; disapproval is a combined emotion of surprise and sadness; remorse is a combined emotion of sadness and disgust; contempt is a combined emotion of disgust and anger; aggressiveness is a combined emotion of anger and anticipation; and optimism is a combined emotion of anticipation and joy. As such, there are 32 emotions in the circular representation 700.

In aspects, colors may be assigned to primary emotions of eight categories 710-780. For example, yellow may be assigned to joy of the category 710; light green may be assigned to trust of the category 720; blue may be assigned to sadness of the category 750; and red may be assigned to anger of the category 770. Levels of each category may be assigned by changing tint, brightness, shade, chroma, saturation, or tone of colors. Now referring back to FIG. 5, within the flattened multimedia message 500, the graphical representation of emotion or sentiment in the second layer 520 may be displayed in color as described with regard to the circular representation 700. Also as described, different emotions in the same category may be displayed with the same color with different tints, brightness, shades, chromas, saturations, or tones.

In aspects, the emotions may be represented by emojis, graphic images, gifs, moving gifs, or any other graphical representations. For example, smiley face emoji, ☺, may be used for joy, and the same color scheme may be applied to the smiley face emoji. In other words, yellow may be the color of the smiley face emoji, and serenity or ecstasy may be represented by the smiley face emoji with different tints, brightness, shades, chromas, saturations, or tones. Above-described color scheme is provided as an example and other types of scheme may also be used to represent different categories and levels of emotions.

In consideration of the circular representation 700 of emotions, there are 32 emotions and likewise, there are 32 graphical representations of the 32 emotions. Thus, displaying the 32 graphical representations may be confusing for users to select one properly representing the user's emotion or sentiment. Now referring back to FIG. 3, graphical representations of one category having a higher priority may be displayed at the top of the sentiment section 314 and other categories with lower priority may be displayed in the bottom of the sentiment section 314. The displaying order of the categories from the top to bottom may be determined based on a distance from the category having the highest priority.

Figure 8:
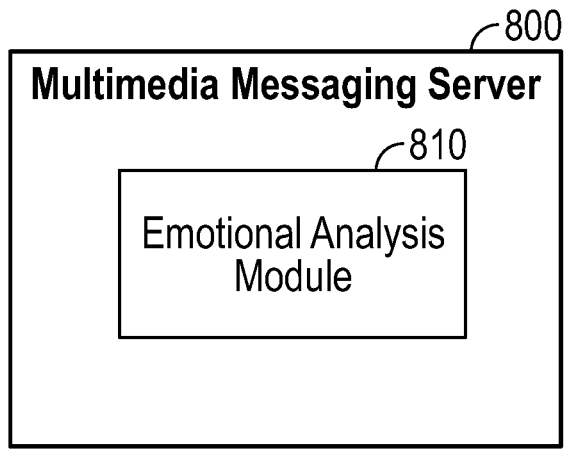
FIG. 8 illustrates a block diagram of a multimedia messaging server in accordance with one or more aspects.

Referring to FIG. 8, illustrated is a multimedia messaging server 800 according to aspects of the present disclosure. The multimedia messaging server 800 may include an emotional analysis module 810 for performing emotional analysis. In particular, when the multimedia messaging server 800 receives an audiovisual content from an audiovisual content server (e.g., 120 of FIG. 1) and obtains a text content from a text content server (e.g., 130 of FIG. 1), the emotional analysis module 810 performs the emotional analysis on the received audiovisual content and text content.

In aspects, the emotional analysis module 810 may categorize each scene of the audiovisual content into one of the nine categories 710-790 of FIG. 7, and determine which category is dominant over the other categories. In a similar way, the emotional analysis module 810 may categorize each term or phrase in the text content into one of the nine categories 710-790, and determine which category is dominant over the other categories. By comparing two emotional analysis results, the emotional analysis module 810 may identify the dominant category and provide the highest priority to the identified category. The multimedia messaging server 800 then displays the identified category up front on the sentiment section (e.g., the sentiment section 314 of FIG. 3) of a user's computing device so that user can select an appropriate graphical representation with ease.

Further, the emotional analysis module 810 may employ artificial intelligence or machine learning algorithms in identifying a dominant category of emotions based on situational factors with the audiovisual content and the corresponding text content. The situational factors such as a location, temperature/weather, social context of proximity of others, social context of messages, phrases in the history of conversations, frequency of emotions, affinity groups of users, regional groups of users, and global total users may be used by the emotional analysis module 810 to identify the dominant category of emotions. In particular, the situational factors may be used to calculate a weight of each category, and the emotional analysis module 810 uses weighted calculations to identify the dominant category and displays the dominant category first in line.

Furthermore, the emotional analysis module 810 may display the other categories with lower priority based on a distance from the dominant category. For example, in a case where the category 710 of FIG. 7 is identified as the dominant category, the graphical representations of the category 710 are displayed first in line, graphical representations of categories 720 and 780 are displayed second in line, graphical representations of categories 730 and 770 are displayed third in line, graphical representations of categories 740 and 760 are displayed fourth in line, and graphical representations of category 750 are displayed at the bottom. The graphical representations of the combination category 790 may be displayed also based on a distance from the dominant category.

In a case where two adjacent categories are equally dominant, a combination of the two adjacent categories may be displayed first in line and other categories are displayed based on a distance from the combination. For example, when categories 730 and 740 are equally dominant, a graphical representation of awe is displayed first in line, the categories 730 and 740 are displayed second in line, and the other categories are displayed based on the distance from the combination.

Figure 9:
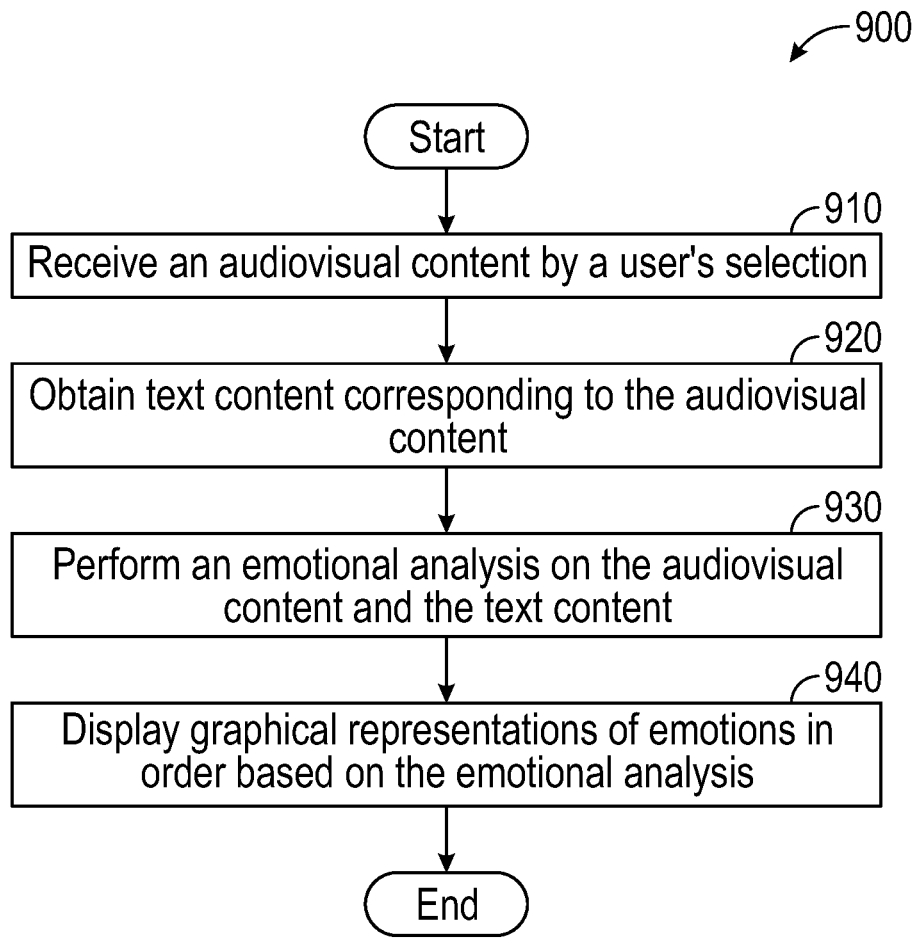
FIG. 9 illustrates a flowchart of a method for displaying graphical representations of emotion in order in accordance with one or more aspects.

FIG. 9 illustrates a method 900 for displaying graphical representation of emotions in order according to aspects of present disclosure. The method 900 displays categories of emotions with priority so that users may be able to select a graphical representation, which best represents their own sentiment at the time, with ease. The method 900 is started by receiving an audiovisual content, which is selected by a user, in step 910. A list of audiovisual contents may be received from an audiovisual content server when a search term from the user is provided. The multimedia messaging server may display the list of audiovisual contents and the user selects one in the list.

The multimedia messaging server may automatically obtain text content, which corresponds to the selected audiovisual content, from a text content server in step 920.

The emotional analysis module of the multimedia messaging server may perform emotional analysis on the selected audiovisual content and the obtained text content in step 930. Based on the emotional analysis, the emotional analysis module may identify a dominant category of emotions.

In step 940, graphical representations, which correspond to the dominant category, may be displayed firstly and graphical representations of other categories may be displayed next based on a distance from the dominant category. In this way, relevant category of emotions can be displayed up front for the users.

Figure 10:
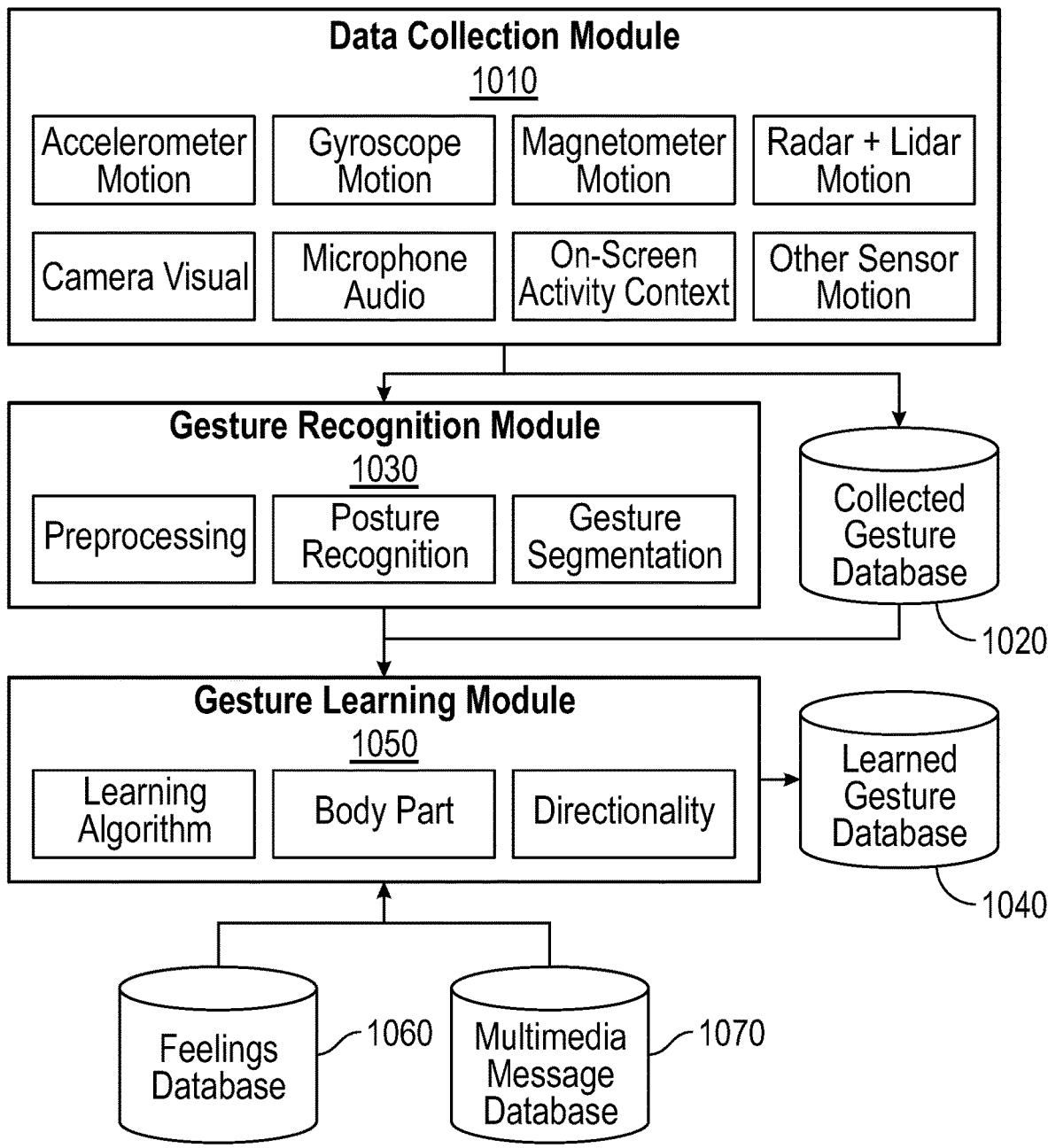
FIG. 10 illustrates a block diagram for gesture recognition in accordance with one or more aspects.

Now referring to FIG. 10, illustrated is a block diagram of a gesture recognition system 1000 for sending multimedia messages based on a gesture according to aspects of present disclosure. The gesture recognition system 1000 may receive sensor data of a user, analyze the sensor data to identify a gesture, and send a multimedia message according to the identified gesture.

The gesture recognition system 1000 includes a data collection module 1010, a collected gesture database 1020, a gesture recognition module 1030, a learned gesture database 1040, a gesture learning module 1050, a feeling database 1060, and a multimedia message database 1070. The data collection module 1010 may receive sensors, which are worn by a user. The sensors may include an accelerometer, gyroscope, magnetometer, radar, lidar, microphone, camera, or other sensors. When a user is making a motion on a touch screen, the sensors may further include the touch screen. The accelerometer and gyroscope may generate and provide data related to accelerations, velocities, and positions thereof. By integrating the accelerations and velocities in consideration of the initial position, a motion of the user who puts on the sensor can be identified. The magnetometer may measure the direction, strength, or relative change of a magnetic field at a particular location. Radar and lidar may be used to determine a distance from the user.

One sensor might not be able to provide sufficient data to track movements of the user to identify a gesture of the user. However, when one sensor data is combined with sensor data from other sensors, it is more likely that a gesture can be identified with accuracy and credibility. Sensor data may be collected during a predetermined period. In an aspect, where there are not substantial changes in the sensor data, the data collection module 1010 may ignore the sensor data. When there are substantial changes in the sensor data, the data collection module 1010 may start collecting sensor data for the predetermined period.

The data collection module 1010 receives sensor data from respective sensors and organizes the sensor data based on the type of sensor. The organized sensor data is saved in the collected gestures database 1020.

The organized sensor data is then fed to the gesture recognition module 1030. Within the gesture recognition module 1030, the organized sensor data is preprocessed to remove noise and outliers. The sensor data may be used to identify the initial posture. For example, the camera data, which includes images captured by a camera, goes through image analysis to identify the initial posture of the user. Then, sensor data from the accelerometer, gyroscope, magnetometer, radar, and lidar are integrated to track each body part of the user from the initial posture to generate a series of movement segments of a gesture.

The gesture learning module 1050 employs artificial intelligence or machine learning algorithms to train a gesture model based on the collected sensor data and the series of segments of the gesture. The artificial intelligence or machine learning algorithms may be trained by supervised, unsupervised, semi-supervised, or reinforced manner or any combination thereof.

Gestures can be identified by following movements of body parts. For example, rolling a dice may be identified by tracking movements of an arm, hand, and fingers, and playing bowling may be identified by tracking movements of legs and arms. Likewise, popping a champagne bottle cork may be identified by tracking arms, hands, and fingers. The gesture learning module 1050 analyzes the series of segments of gestures to identify body parts and track movements and directionalities of the body parts. When a gesture is identified, the learned gesture database 1040 stores the gesture with the series of segments.

Since the purpose of the gesture is to send a multimedia message, the identified gesture may be connected or correlated to a multimedia message, which has been previously stored in the multimedia message database 1070 and is a flattened multimedia message. In other words, when the identified gesture is detected or identified, the corresponding flattened multimedia message, which is saved in the multimedia message database 1070, may be automatically sent.

In a case where a flattened multimedia message is not correlated with the gesture, the user needs to search for and select an audiovisual content from the audiovisual content server and a graphical representation from the feelings database 1060. The identified gesture corresponds to one or more emotions or feelings saved in the feeling database 1060. The data from the microphone may be used to determine the feelings of the user. A search term corresponding to the feelings is transmitted to the audiovisual content server. As described above, the user selects one among the list of audiovisual contents, and the text content, which corresponds to the selected audiovisual content, can be automatically obtained from the text content server. Then, the selected audiovisual content, the graphical representation of the user's sentiment, and the text content are combined to generate a flattened multimedia message. A correlation between the identified gesture and the flattened multimedia message is made. Based on this correlation, whenever the identified gesture is detected, the corresponding flattened multimedia message is sent to other users. Such correlations may be saved in a database, which is a relational database.

Examples of predetermined gestures include a popping a champagne bottle cork, which may be correlated to a flattened multimedia message having a party or joy feeling, and a rolling-a-dice motion, which may send an arbitrary multimedia message. Examples of predetermined gestures on a touch screen include drawing a heart, which may be correlated to a heartful multimedia message, and flickering a coin into the air, which may be correlated to one of the flattened multimedia message.

In a case where a user puts on a head mounted display to play within a VR, AR, MR, or metaverse, gestures may be made via a series of keyboard strokes or mouse movements. In this case, gestures may be recognized via motions shown within the VR, AR, MR, or metaverse. In other words, the gestures may be recognized via image processing. In this instance, the data collection module 1010 may acquire moving images from the VR, AR, MR, or metaverse, gesture recognition module 1030 may perform image processing to identify body parts, detect motions or movements, and recognize gestures.

In a case where motions of the user within VR, AR, MR, or metaverse corresponds to motions of the user in the real world, the gestures may be recognized based on sensor data from the sensors positioned on the body of the user.

Figure 11:
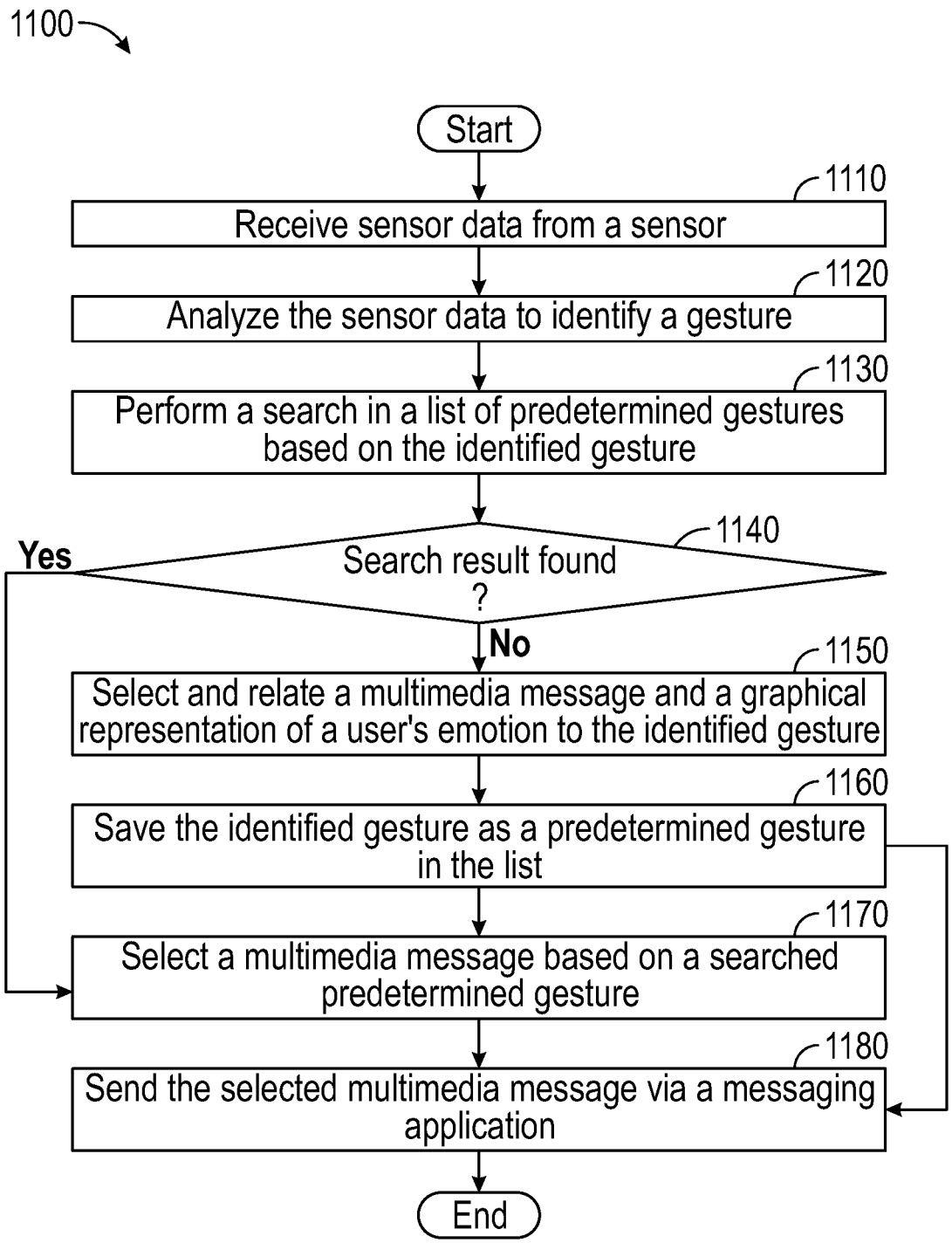
FIG. 11 illustrates a flowchart for recognizing a gesture to send a multimedia message in accordance with one or more aspects.

Now referring to FIG. 11, illustrated is a method 1100 for sending a multimedia message based on a gesture according to aspects of the present disclosure. A user moves body parts and one or more sensors on the body parts generate sensor data. In step 1110, a multimedia messaging device receives the sensor data. In a case where a user's gesture is made via a series of keyboard strokes, mouse movements, or other input devices, the sensor may be the keyboard, mouse, or any other input devices, and the sensor data are data from the keyboard and mouse.

In step 1120, a gesture recognition module of the multimedia messaging device analyzes the sensor data to identify a gesture. In aspects, all sensor data may be integrally analyzed by artificial intelligence or machine learning algorithms. Camera may be used to capture an initial posture, or a magnetometer, lidar, and/or radar may be also used to estimate the initial posture by estimating a distance of each body part from a reference position. In a case for the VR, AR, MR, or metaverse, analyzation may be performed on the data from the keyboard, mouse, or any other input devices, or may be performed on moving image data from the VR, AR, MR, or metaverse when there is no sensor data.

In various embodiments, gestures may be learned through a training method, described below in FIG. 13. Briefly, the training method may teach the gesture recognition module of the multimedia messaging device a movement, or movements, that identify a gesture.

When a gesture is identified, a search is performed in a database, which stores previously saved multimedia messages, based on the identified gesture in step 1130. In an aspect, a relational database may be used in the search.

In step 1140, it is determined whether or not a search result is found in the list. When it is determined that the identified gesture is found in the relational database, the corresponding multimedia message can be found and selected based on the correlation in step 1170.

In a case where it is determined that the identified gesture is not found in the list, selection of an audiovisual content and a graphical representation of the user's emotion may be made and a relation between the identified gesture and both of the selected audiovisual content and graphical representation may be made in step 1150. The identified gesture is then saved as a predetermined gesture in the list of predetermined gestures, and the relational correspondence of the identified gesture is saved in the relational database for later searches in step 1160.

After steps 1160 and 1170, the selected multimedia message is sent to other users via a messaging application in step 1180.

Figure 12:
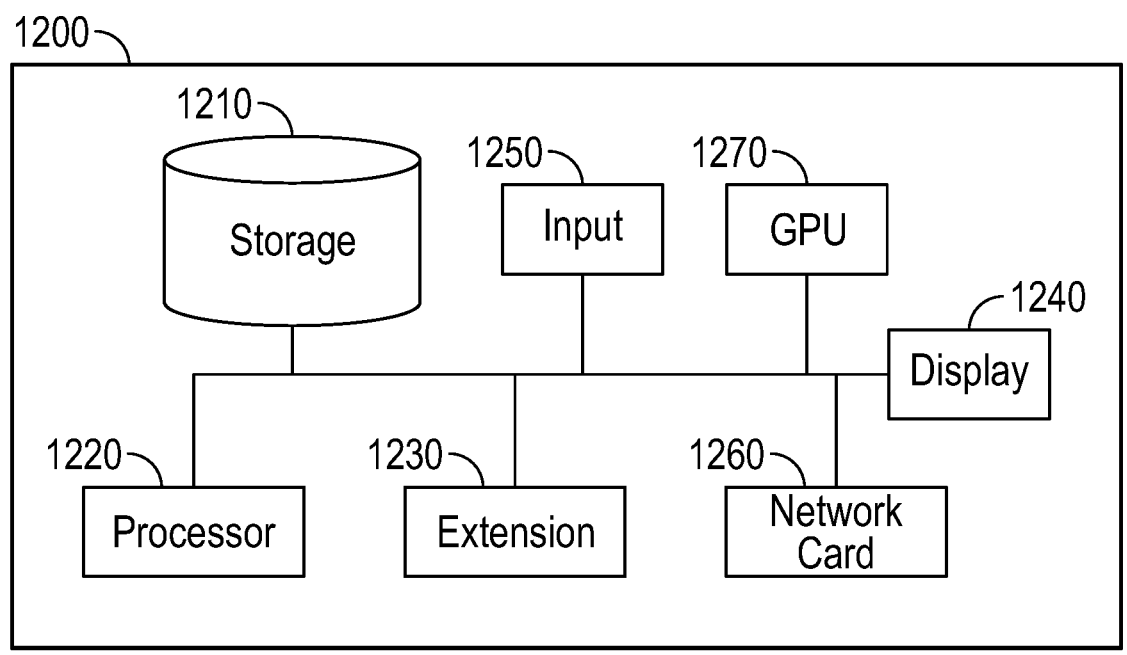
FIG. 12 illustrates a block diagram of a computing device in accordance with one or more aspects.

Referring to FIG. 12, illustrated is a block diagram for a computing device 1200 representative of the computing device, which may be any device for sending and receiving multimedia messages in accordance with aspects of the present disclosure. The computing device 1200 may include, by way of non-limiting examples, server computers, desktop computers, laptop computers, notebook computers, subnotebook computers, netbook computers, netpad computers, set-top computers, handheld computers, Internet appliances, mobile smartphones, tablet computers, personal digital assistants, video game consoles, embedded computers, cloud servers, and the likes. Those of skill in the art will recognize that many smartphones are suitable for use in the multimedia messaging system described herein. Suitable tablet computers include those with booklet, slate, and convertible configurations, known to those of skill in the art.

In aspects, the computing device 1200 includes an operating system configured to perform executable instructions. The operating system is, for example, software, including programs and data, which manages the device's hardware and provides servers for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, Novell® NetWare®, iOS®, Android®, and the like. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In aspects, the operating system is provided by cloud computing. Those of skill in the art will also recognize that suitable mobile smart phone operating systems include, by way of non-limiting examples, Nokia® Symbian® OS, Apple® IOS®, Research In Motion® BlackBerry OS®, Google® Android®, Microsoft® Windows Phone® OS, Microsoft® Windows Mobile® OS, Linux®, and Palm® WebOS®.

In aspects, the computing device 1200 may include a storage 1210. The storage 1210 is one or more physical apparatus used to store data or programs on a temporary or permanent basis. In aspects, the storage 1210 may be volatile memory and requires power to maintain stored information. In aspects, the storage 1210 may be non-volatile memory and retains stored information when the computing device 1200 is not powered. In aspects, the non-volatile memory includes flash memory. In aspects, the non-volatile memory includes dynamic random-access memory (DRAM). In aspects, the non-volatile memory includes ferroelectric random-access memory (FRAM). In aspects, the non-volatile memory includes phase-change random access memory (PRAM). In aspects, the storage 1210 includes, by way of non-limiting examples, CD-ROMs, DVDs, flash memory devices, magnetic disk drives, magnetic tapes drives, optical disk drives, and cloud-based storage. In aspects, the storage 1210 may be a combination of devices such as those disclosed herein.

The computing device 1200 further includes a processor 1220, an extension 1230, a display 1240, an input device 1250, and a network card 1260. The processor 1220 is a brain to the computing device 1200. The processor 1220 executes instructions which implement tasks or functions of programs. When a user executes a program, the processor 1220 reads the program stored in the storage 1210, loads the program on the RAM, and executes instructions prescribed by the program.

The processor 1220 may include a microprocessor, central processing unit (CPU), application specific integrated circuit (ASIC), arithmetic coprocessor, or image processor, each of which is electronic circuitry within a computer that carries out instructions of a computer program by performing the basic arithmetic, logical, control and input/output (I/O) operations specified by the instructions.

In aspects, the extension 1230 may include several ports, such as one or more universal serial buses (USBs), IEEE 1394 ports, parallel ports, and/or expansion slots such as peripheral component interconnect (PCI) and PCI express (PCIe). The extension 1230 is not limited to the list but may include other slots or ports that can be used for appropriate purposes. The extension 1230 may be used to install hardware or add additional functionalities to a computer that may facilitate the purposes of the computer. For example, a USB port can be used for adding additional storage to the computer and/or an IEEE 1394 may be used for receiving moving/still image data.

In aspects, the display 1240 may be a cathode ray tube (CRT), a liquid crystal display (LCD), or light emitting diode (LED). In aspects, the display 1240 may be a thin film transistor liquid crystal display (TFT-LCD). In aspects, the display 1240 may be an organic light emitting diode (OLED) display. In various aspects, the OLED display is a passive-matrix OLED (PMOLED) or active-matrix OLED (AMOLED) display. In aspects, the display 1240 may be a plasma display. In aspects, the display 1240 may be a video projector. In aspects, the display may be interactive (e.g., having a touch screen or a sensor such as a camera, a 3D sensor, a LiDAR, a radar, etc.) that can detect user interactions/gestures/responses and the like. In still aspects, the display 1240 may be a combination of devices such as those disclosed herein.

A user may input and/or modify data via the input device 1250 that may include a keyboard, a mouse, a virtual keyboard, or any other device with which the use may input data. The display 1240 displays data on a screen of the display 1240. The display 1240 may be a touch screen so that the display 1240 can be used as an input device.

The network card 1260 is used to communicate with other computing devices, wirelessly or via a wired connection. Through the network card 1260, multimedia messages can be exchanged or relayed among users.

The computing device 1200 may further include a graphics processing unit (GPU) 1270, which generally accelerate graphics rendering. However, since the GPU 1270 is able to parallelly process many pieces of data simultaneously, the GPU 1270 may be used for machine learning systems and algorithms. The GPU 1270 may cooperate with the processor 1220 for artificial intelligence to generate, execute, and enhance gesture learning algorithms. In aspects, the GPU 1270 may include more than one GPU to further enhance processing power.

Figure 13:
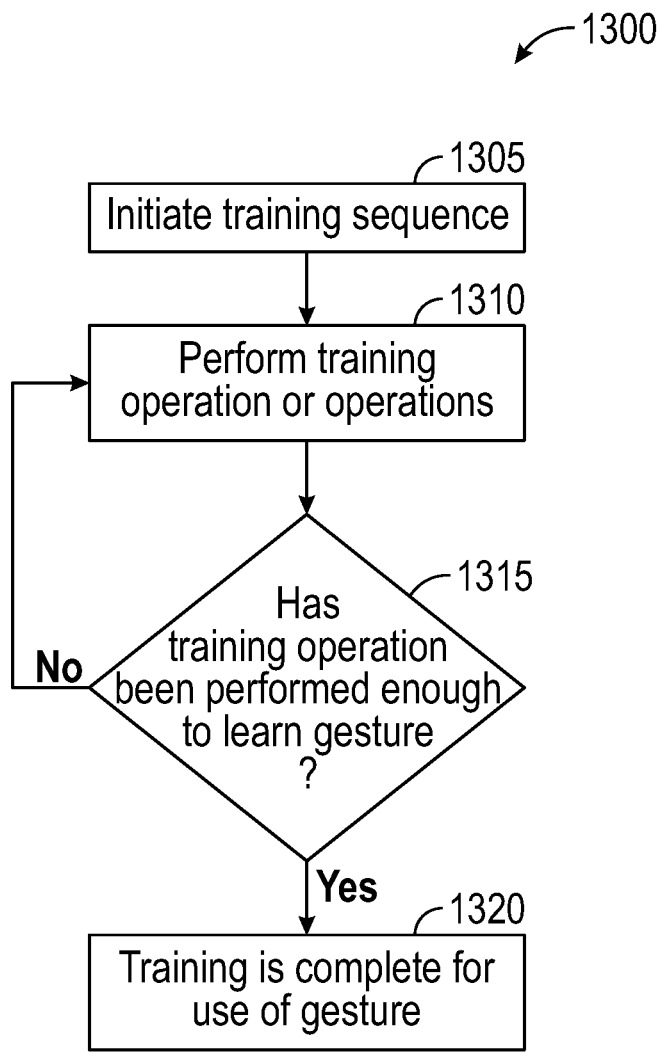
FIG. 13 illustrates a flowchart for an example method of training a gesture recognition module to identify a gesture in accordance with one or more aspects.
Figure 14A:
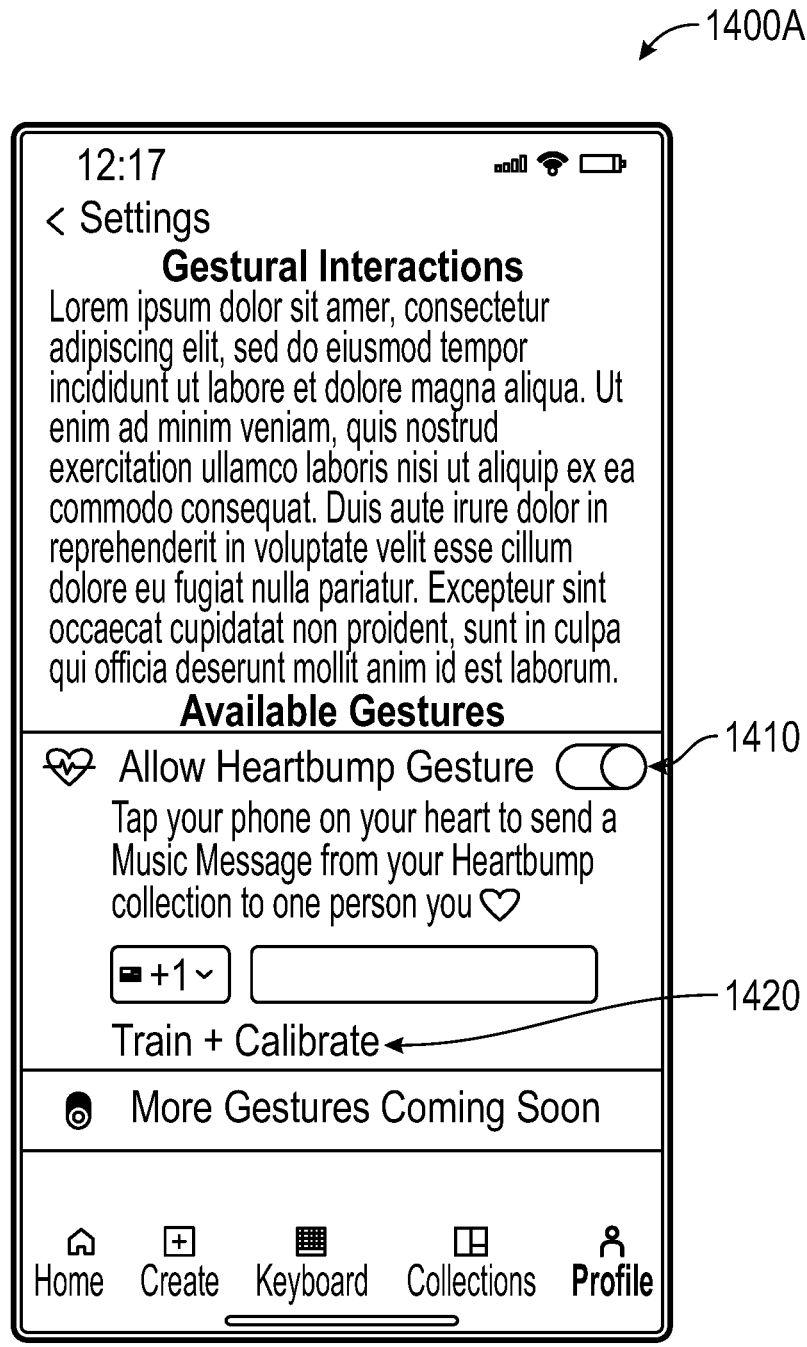
FIGS. 14A-14E illustrate a graphical representation of mobile device screens showing an example heartbump training gesture in accordance with one or more aspects.
Figure 14B:
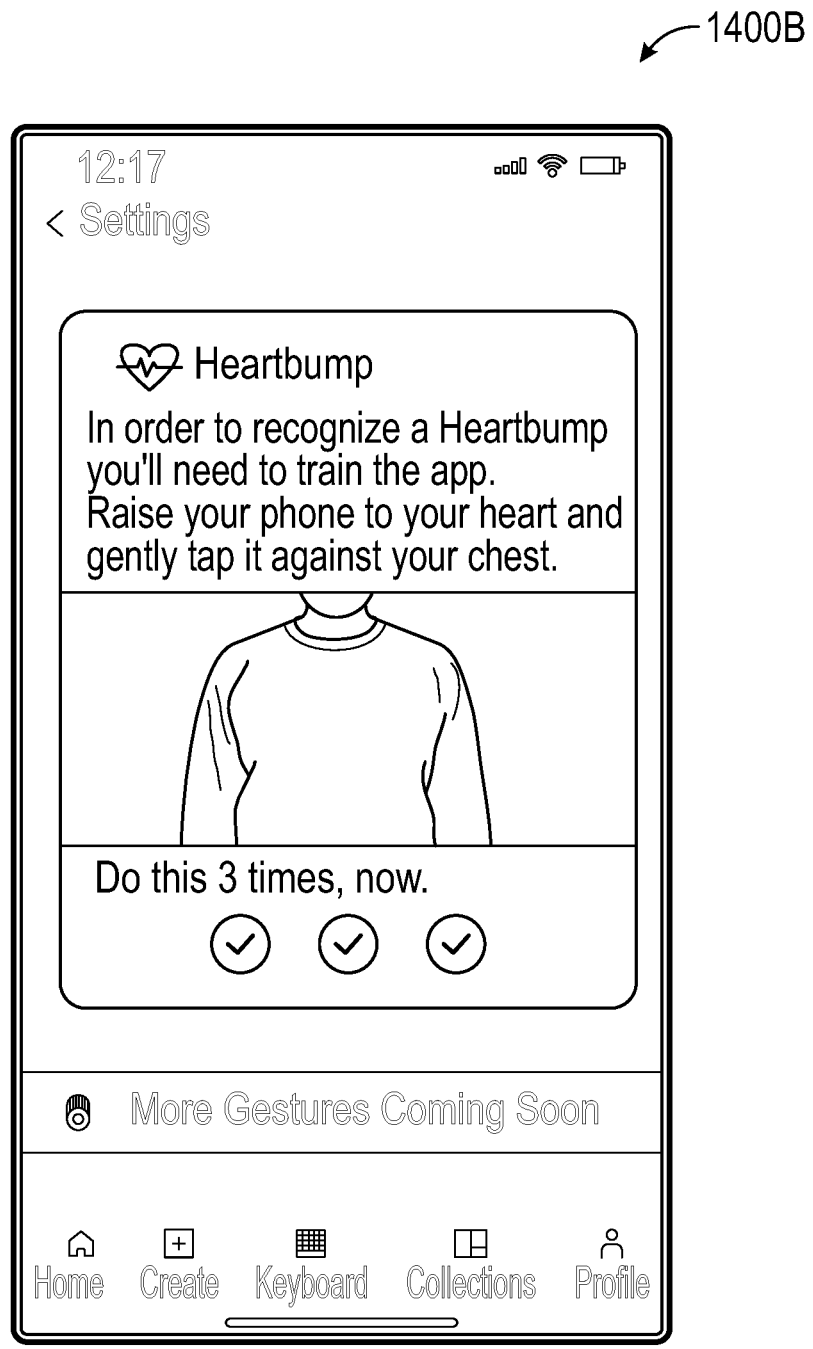
Figure 14C:
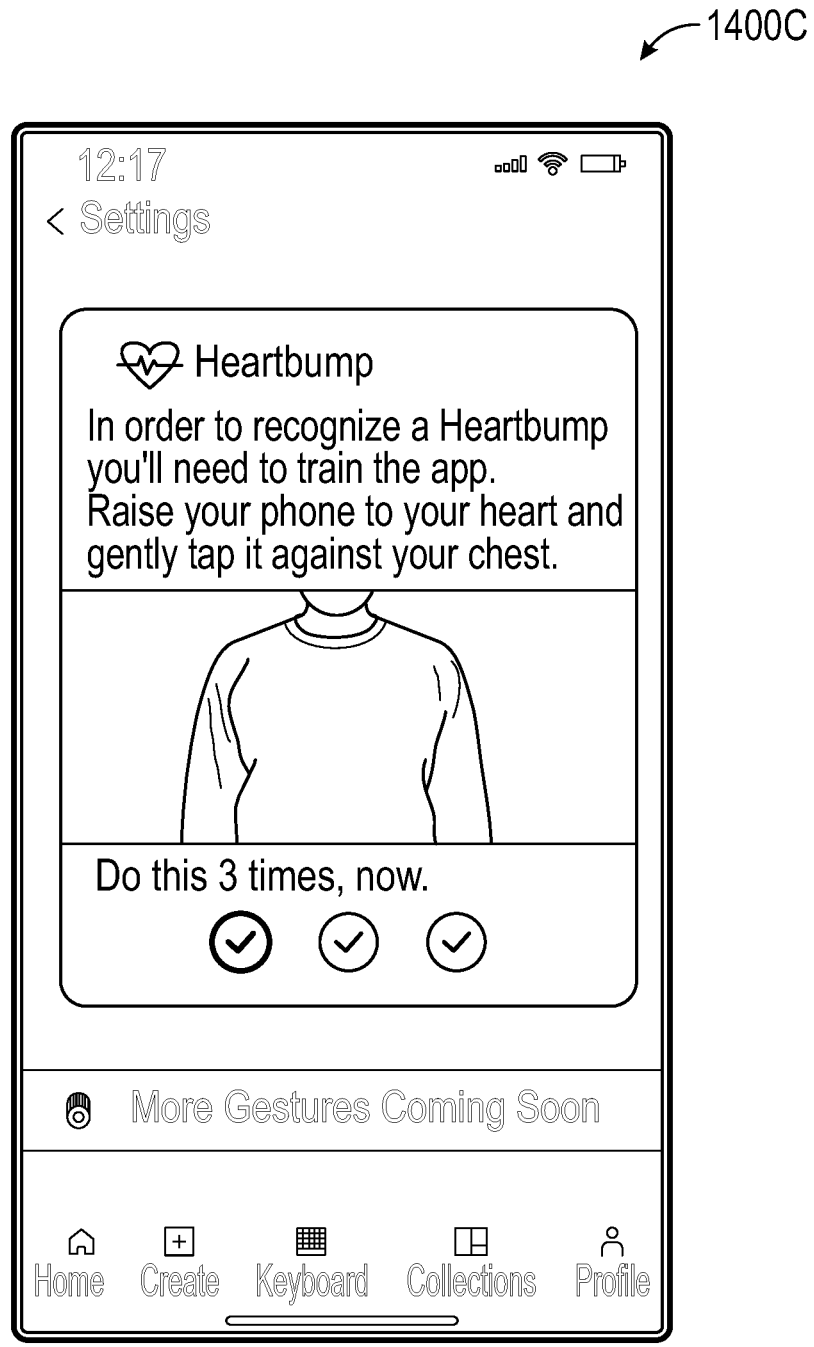
Figure 14D:
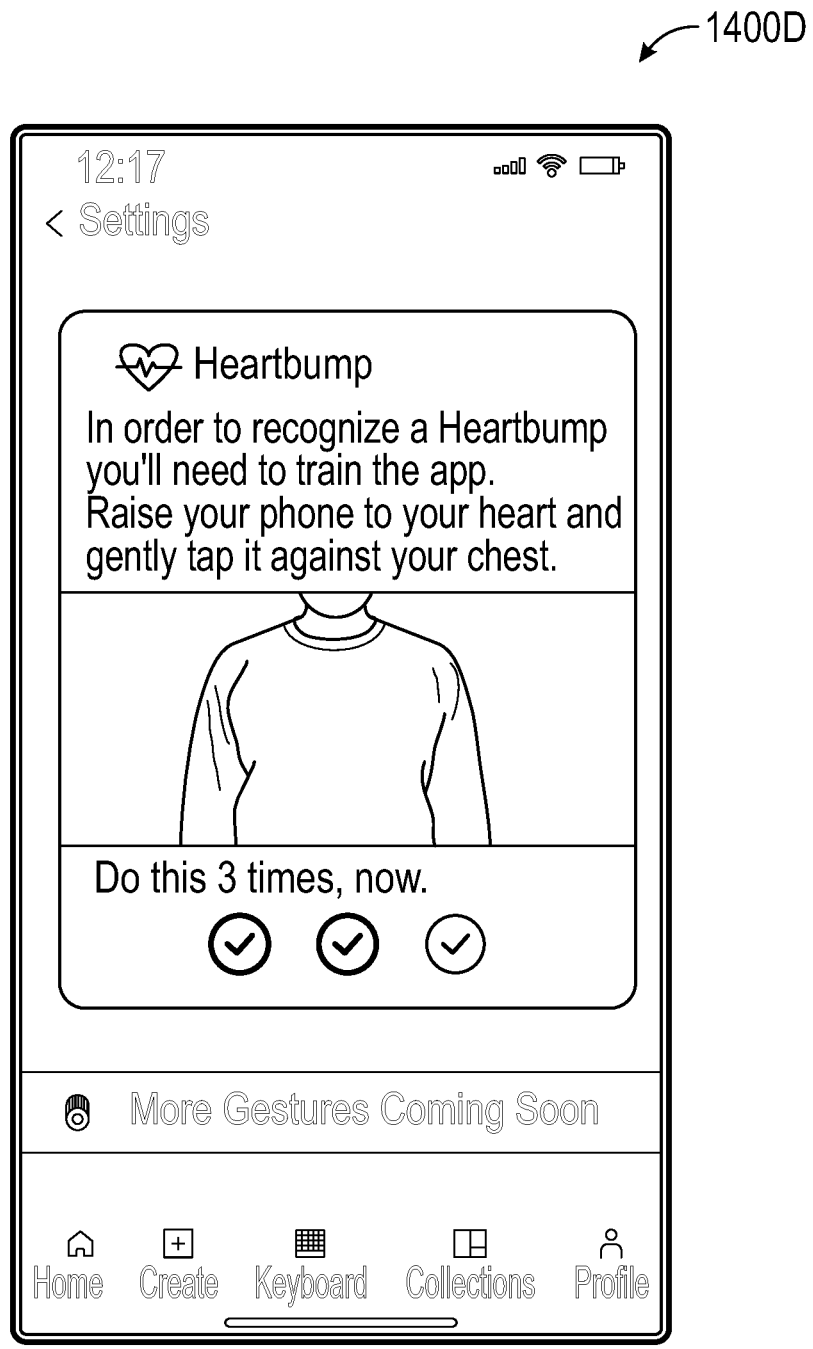
Figure 14E:
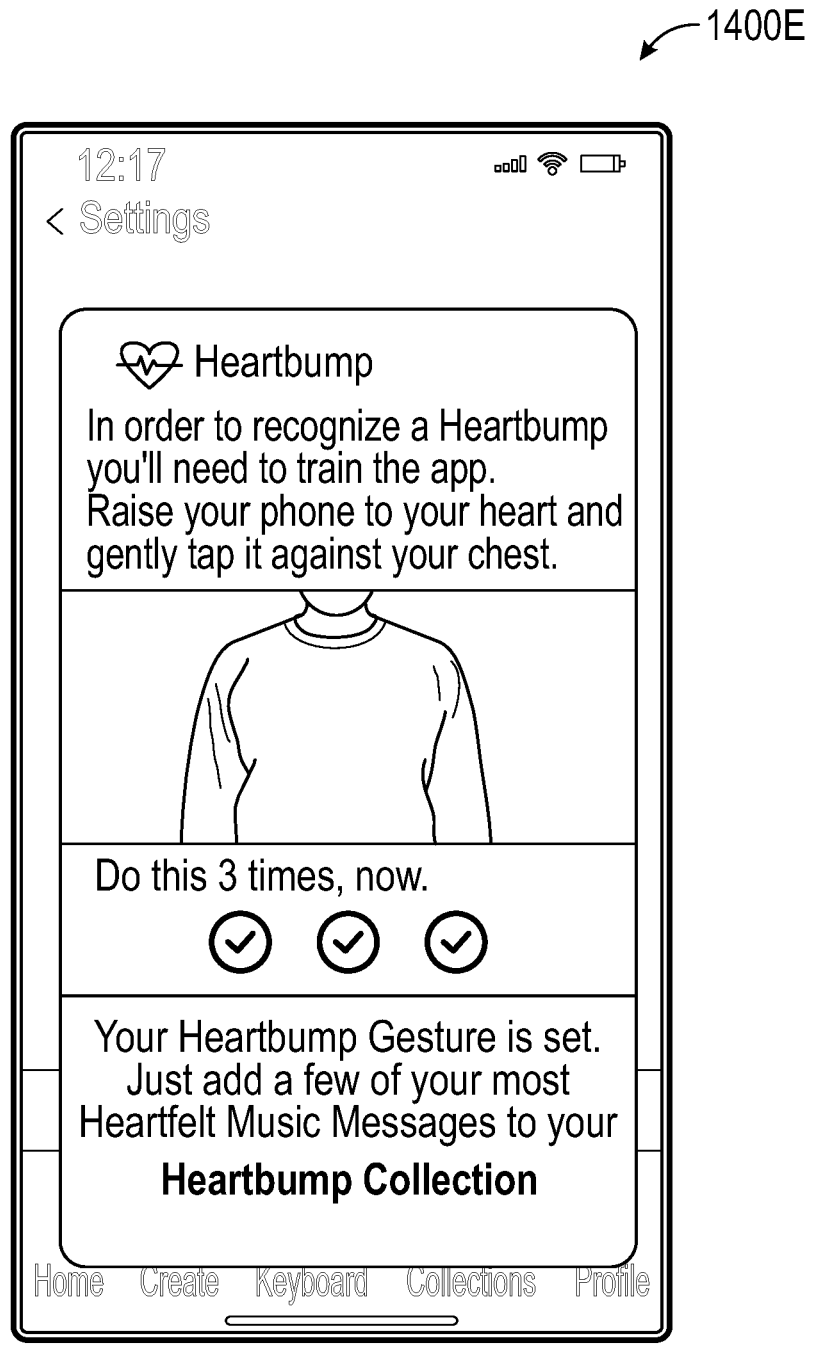

Referring now to FIGS. 13-14E, an example technique for training a gesture recognition module is described. For example, FIG. 13 illustrates a flowchart for an example method 1300 of training a gesture recognition module to identify a gesture in accordance with one or more aspects.

For example, in step 1305, a training sequence is initiated. In various embodiments, the training sequence may include training the gesture recognition module (e.g., gesture recognition module 1030) to recognize one or more motions or operations associated with a gesture. In an example embodiment, a message may be sent by tapping a user's device (e.g., computer device 145) to the user's heart or other body area in a gesture that may be defined as a "heartbump gesture".

FIGS. 14A-14E, illustrate a graphical representation of mobile device screens showing an example heartbump training gesture in accordance with one or more aspects. As shown in FIG. 14A, screen 1400A shows a listing of available gestures. For purposes of example, a heartbump gesture is discussed herein, however, other gestures may be available in the "available gestures" area shown on screen 1400A. A selection button 1410 allows for the heartbump gesture to be allowed or disallowed. In various embodiments, the selection button 1410 may be a slider type selector such that a user slides the button on the screen to turn on (allow) or off (disallow) the feature (e.g., heartbump gesture).

A "train-calibrate" operation 1420 operation may be activated by clicking the text to initiate the training for the heartbump gesture. Accordingly, a user may initiate the training (step 1305 of method 1300) by selecting the "train-calibrate" operation 1420. Accordingly, once the training is initiated, the user may perform a training operation, or operations, in step 1310.

For example, with respect to training the device 145 to recognize the heartbump gesture, the user may raise the phone to their heart area and gently tap it on their chest one or more times. FIG. 14B shows an example screen 1400B, where the training has been initiated and a user is being instructed to tap the device (e.g., phone) against their chest. In various embodiments, an example number of times may be three times. That is, a user may be asked to tap the phone against their chest three times to train the heartbump gesture. Accordingly, in step 1315, if the training operation has not been performed enough times to learn the gesture, the method reverts to step 1310.

Accordingly, after a first tap, the screen may appear as in screen 1400C of FIG. 14C, where a first check box is highlighted. After a second tap, the screen may appear as in screen 1400D of FIG. 14D, where a second check box is highlighted. After a third tap, the screen may appear as in screen 1400E of FIG. 14E, where three checkboxes are highlighted and an indication that the heartbump gesture is set (i.e., trained). Therefore, the method 1300 may proceed to step 1320, where training is complete for the gesture.

Figure 15:
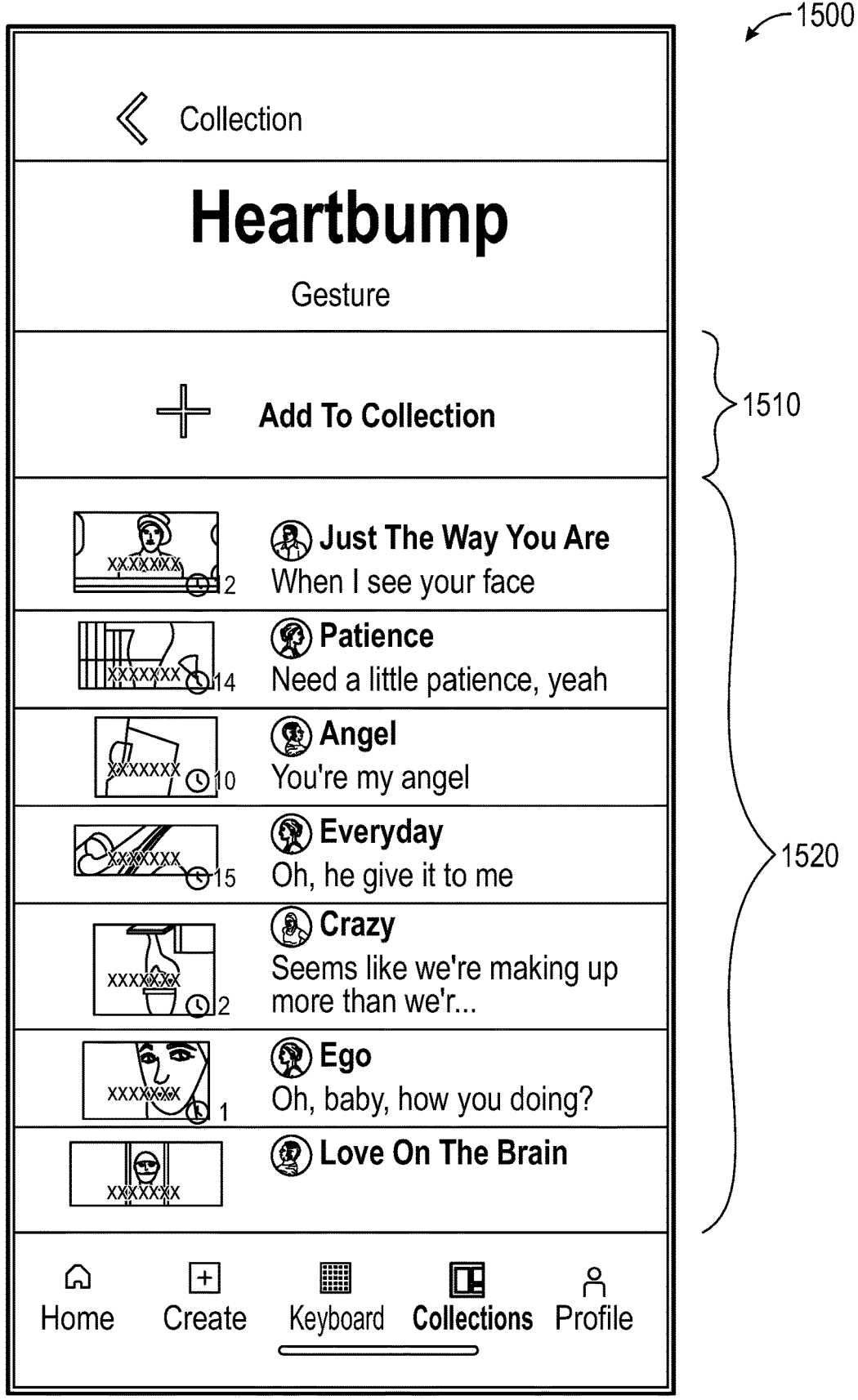
FIG. 15 illustrates a graphical representation of a mobile device screen showing an example heartbump gesture collection in accordance with one or more aspects.

FIG. 15 illustrates a graphical representation of a mobile device screen 1500 showing an example heartbump gesture collection in accordance with one or more aspects. The screen 1500 shows an add to collection portion 1510 and a collection portion 1520. The collection portion 1520, in various example embodiments, may include media that is selected for sending to a recipient during an operation of the heartbump gesture, described below.

Figure 16:
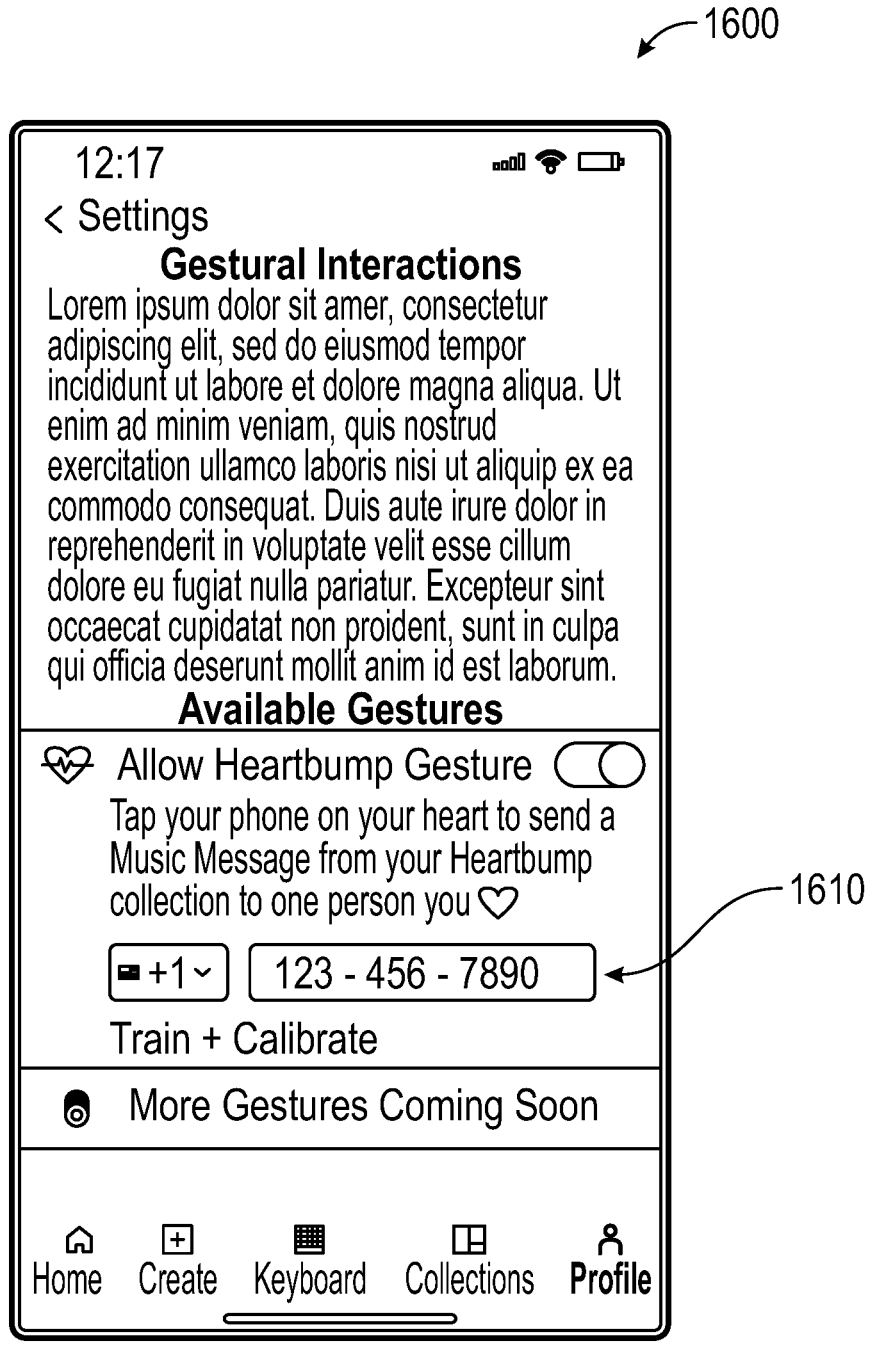
FIG. 16 illustrates a graphical representation of a mobile device screen showing an example heartbump gesture message sending operation in accordance with one or more aspects.

FIG. 16 illustrates a graphical representation of a mobile device screen 1600 showing an example heartbump gesture message sending operation in accordance with one or more aspects. As shown in FIG. 16, a recipient area 1610 may be included in the screen 1600, where, for example, a recipient's phone number may be entered for receiving the heartbump gesture.

Accordingly, once the device 145 is trained in method 1300 of FIG. 13 for the heartbump gesture, a user may enter a recipient phone number in the recipient area 1610. When the user taps the trained device 145 to their chest, the gesture may be recognized as a heartbump gesture and media from the heartbump gesture collection 1620 may be selected and sent to the recipient.

Any of the herein described methods, programs, algorithms, or codes may be converted to, or expressed in, a programming language or computer program. The terms "programming language" and "computer program," as used herein, include any language used to specify instructions to a computer, and include (but not limited to) the following languages and their derivatives: Assembler, Basic, Batch files, BCPL, C, C+, C++, C#, Delphi, Fortran, Java, JavaScript, machine code, operating system command languages, Pascal, Perl, PL1, scripting languages, Visual Basic, meta-languages which themselves specify programs, and all first, second, third, fourth, fifth, or further generation computer languages. Also included are database, other data schemas, and any other meta-languages. No distinction is made between languages which are interpreted or compiled. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), GPUs, or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, the above-described servers and computing devices.

In various embodiments, a computing apparatus (e.g., mobile phone, wearable, TV with camera, AR/VR input devices) that is capable to recognize user motion data using accelerometers, cameras, radar, or any combination thereof may perform the methods described above.

In various embodiments, software that recognizes the gestures by using methods of artificial intelligence (AI) or other methods, may perform the methods described above. In various embodiments, the gestures may include explicit gestures that users do intentionally, (e.g. gestures that mimic regular motions such as throwing a ball, heart bump, etc). In various embodiments, the gestures may include explicit gestures that are symbolic, (e.g. triangles, love shape, etc.). In various embodiments, the gestures may include implicit gestures and motions such as walking, jumping, running, dancing that people do normally. In various embodiments, the gestures may include user created gestures.

In various embodiments, a system allows the user to associate the gestures with a predefined set of emotional states, as defined in previous patents, (e.g. sad, happy, etc.).

In various embodiments, a system allows an association of emotional state with specific feels or group of feels that reflect the emotional states of the user and can be proposed to the user when the gesture is triggered.

In various embodiments, an interaction system that triggers sending the feels once the gesture is recognized to specific person or group of people or public services.

In various embodiments, an interaction system measures emotional states from previous feels being sent using some other methods, (e.g. texts, and update what feels that are proposed when the gesture is triggered).

In various embodiments, an interaction system recognizes the overall context of the user, (e.g. geolocation in the school, in the car, in the gym, as well as activities dancing, etc.) and updates the associated between gestures and emotions and feels based on the context.

In various embodiments, an interaction system associates motions and gestures with voice input, (e.g. commands, song texts, etc.) to help to select feels or simplify sending the feels.

In various embodiments, multimedia messages may be selected randomly or via any selection algorithm desired.

While the description above refers to particular aspects of the present disclosure, it will be understood that many modifications may be made without departing from the spirit thereof. Additional steps and changes to the order of the algorithms can be made while still performing the key teachings of the present disclosure. Thus, the accompanying claims are intended to cover such modifications as would fall within the true scope and spirit of the present disclosure. The presently disclosed aspects are, therefore, to be considered in all respects as illustrative and not restrictive, the scope of the disclosure being indicated by the appended claims rather than the foregoing description. Unless the context indicates otherwise, any aspect disclosed herein may be combined with any other aspect or aspects disclosed herein. All changes that come within the meaning of, and range of, equivalency of the claims are intended to be embraced therein.

What is claimed is:

1. A messaging apparatus for sending a multimedia message via a gesture, the messaging apparatus comprising:
    a processor; and
    a memory coupled to the processor and including instructions stored thereon that, when executed by the processor, cause the messaging apparatus to:
    receive sensor data from one or more sensors;
    analyze the received sensor data to identify a gesture;
    perform a search in a list of predetermined gestures based on the identified gesture;
    select a multimedia message based on a searched predetermined gesture;
    generate a flattened multimedia message based upon the selected multimedia message, the flattened multimedia message including a music file selected based on the searched predetermined gesture and a text content corresponding to the music file or a lyric corresponding to the music file; and
    send the flattened multimedia message including the music file and the text content corresponding to the music file or the lyric corresponding to the music file via a messaging application.

2. The messaging apparatus according to claim 1, wherein the list of predetermined gestures has been previously saved.

3. The messaging apparatus according to claim 1, further comprising a touch screen, which functions as the one or more sensors.

4. The messaging apparatus according to claim 3, wherein the touch screen generates the sensor data based on a motion of a user on the touch screen.

5. The messaging apparatus according to claim 1, wherein the one or more sensors include a motion sensor.

6. The messaging apparatus according to claim 5, wherein the sensor is worn by a user.

7. The messaging apparatus according to claim 5, wherein the motion sensor includes at least one of a gyroscope, accelerometer, magnetometer, radar, or lidar.

8. The messaging apparatus according to claim 1, wherein the sensor data is collected within a predetermined time.

9. The messaging apparatus according to claim 1, wherein a relationship database between the list of predetermined gestures and multimedia messages is stored in the memory.

10. The messaging apparatus according to claim 9, wherein the selected multimedia message is related to the searched predetermined gesture based on the relationship database.

11. The messaging apparatus according to claim 1, further comprising the messaging apparatus training a first predetermined gesture of the list of predetermined gestures.

12. The messaging apparatus according to claim 11, wherein the training the first predetermined gesture of the list of predetermined gestures includes tapping an apparatus to a chest of a user a first time.

13. The messaging apparatus according to claim 12, wherein the training the first predetermined gesture of the list of predetermined gestures includes tapping the apparatus to the chest of the user one or more subsequent times to complete training of the first predetermined gesture.

14. The messaging apparatus according to claim 13, wherein upon tapping the apparatus to the chest of the user upon completion of training for the first predefined gesture includes selecting a multimedia message associated with the first predetermined gesture; and sending the selected multimedia message via the messaging application.

15. A messaging method for sending a multimedia message via a gesture, the messaging method comprising:
    receiving sensor data from one or more sensors;
    analyzing the received sensor data to identify a gesture;
    performing a search in a list of predetermined gestures based on the identified gesture;
    selecting a multimedia message based on a searched predetermined gesture;
    generating a flattened multimedia message based upon the selected multimedia message, the flattened multimedia message including a music file selected based on the searched predetermined gesture and a text content corresponding to the music file or a lyric corresponding to the music file; and
    sending the flattened multimedia message including the music file and the text content corresponding to the music file or the lyric corresponding to the music file via a messaging application.

16. The messaging method according to claim 15, wherein the list of predetermined gestures has been previously saved.

17. The messaging method according to claim 15, wherein the one or more sensors include a touch screen.

18. The messaging method according to claim 17, further comprising:
    sensing, by the touch screen, the sensor data based on a motion of a user on the touch sensor.

19. The messaging method according to claim 15, wherein the sensor is a motion sensor.

20. The messaging method according to claim 19, wherein the motion sensor includes at least one of a gyroscope, accelerometer, magnetometer, radar, or lidar.

21. The messaging method according to claim 15, wherein the sensor data is collected within a predetermined time.

22. The messaging method according to claim 15, wherein a relationship database between the list of predetermined gestures and multimedia messages is stored in a memory.

23. The messaging method according to claim 22, wherein the selected multimedia message is related to the searched predetermined gesture based on the relationship database.

24. The messaging method according to claim 15, further comprising training a first predetermined gesture of the list of predetermined gestures.

25. The messaging method according to claim 24, wherein the training the first predetermined gesture of the list of predetermined gestures includes tapping an apparatus to a chest of a user a first time.

26. The messaging method according to claim 25, wherein the training the first predetermined gesture of the list of predetermined gestures includes tapping the apparatus to the chest of the user one or more subsequent times to complete training of the first predetermined gesture.

27. The messaging method according to claim 26, wherein upon tapping the apparatus to the chest of the user upon completion of training for the first predefined gesture includes selecting a multimedia message associated with the first predetermined gesture; and sending the selected multimedia message via the messaging application.

28. A nontransitory computer-readable storage medium including instructions stored thereon that, when executed by a computer, cause the computer to perform a messaging method for sending a multimedia message, the messaging method comprising:

receiving sensor data from one or more sensors;

analyzing the received sensor data to identify a gesture;

performing a search in a list of predetermined gestures based on the identified gesture;

selecting a multimedia message based on a searched predetermined gesture;

generating a flattened multimedia message based upon the selected multimedia message, the flattened multimedia message including a music file selected based on the searched predetermined gesture and a text content or lyric corresponding to the music file; and sending the flattened multimedia message including the music file and the text content corresponding to the music file or the lyric corresponding to the music file via a messaging application.

* * * * *